US012808838B2

(12) United States Patent
Takashima et al.

(10) Patent No.: US 12,808,838 B2
(45) Date of Patent: Nov. 24, 2026

(54) CONSTANT POTENTIAL ELECTROLYTIC GAS SENSOR AND METHOD FOR MANUFACTURING CONSTANT POTENTIAL ELECTROLYTIC GAS SENSOR

(71) Applicants: NEW COSMOS ELECTRIC CO., LTD., Osaka (JP); FIGARO ENGINEERING INC., Osaka (JP)

(72) Inventors: Hiromasa Takashima, Osaka (JP); Katsunori Kondo, Osaka (JP); Tomonori Sakaguchi, Osaka (JP); Hiroki Kido, Osaka (JP); Yoshishige Ninomiya, Osaka (JP)

(73) Assignees: NEW COSMOS ELECTRIC CO., LTD, Osaka (JP); FIGARO ENGINEERING INC., Osaka (JP)

( * ) Notice: Subject to any disclaimer, the term of this patent is extended or adjusted under 35 U.S.C. 154(b) by 394 days.

(21) Appl. No.: 18/578,494

(22) PCT Filed: Jul. 13, 2022

(86) PCT No.: PCT/JP2022/027605
§ 371 (c)(1),
(2) Date: Dec. 20, 2024

(87) PCT Pub. No.: WO2023/286814
PCT Pub. Date: Jan. 19, 2023

(65) Prior Publication Data

US 2025/0180507 A1 Jun. 5, 2025

(30) Foreign Application Priority Data

Jul. 13, 2021 (JP) ................................. 2021-115737

(51) Int. Cl.
*G01N 27/413* (2006.01)
*G01N 27/30* (2006.01)
(Continued)

(52) U.S. Cl.
CPC ......... *G01N 27/413* (2013.01); *G01N 27/301* (2013.01); *G01N 27/414* (2013.01)

(58) Field of Classification Search
CPC ............... G01N 27/413; G01N 27/404; G01N 27/4045; G01N 27/301
See application file for complete search history.

(56) References Cited

U.S. PATENT DOCUMENTS 5,284,566 A * 2/1994 Cuomo .............. G01N 27/4045 204/415
5,914,019 A * 6/1999 Dodgson .............. G01N 27/404 156/308.2
(Continued)

FOREIGN PATENT DOCUMENTS

JP 51-93293 A 8/1976
JP 51-107195 A 9/1976
(Continued)

OTHER PUBLICATIONS

J-Plat Pat machine-generated English language translation of JP 11-18333 A, patent published Jul. 9, 1999 (Year: 1999).*
(Continued)

*Primary Examiner* — Alexander S Noguerola
(74) *Attorney, Agent, or Firm* — Francis J. Maguire; WARE FRESSOLA MAGUIRE & BARBER LLP

(57) ABSTRACT

A constant potential electrolytic gas sensor 1 of the present invention comprises a case with a case body 21, an electrode structure 3 comprising electrodes 31, 32, 33 provided in the case body 21, lead wires 41, 42, 43 connected to the surfaces of the electrodes 31, 32, 33, and external electrodes 51, 52, 53 that are provided in the case body 21 and are connected to the lead wires 41, 42, 43, wherein the electrodes are arranged so that a connection point CP of the external electrode to which the lead wire is connected is located at a height corresponding to the electrode structure 3, and
(Continued)

wherein the case body 21 has a holding structure 8 that can hold a predetermined amount of protective agent so as to cover the connection point CP, with respect to each of the external electrodes.

8 Claims, 13 Drawing Sheets

(51) Int. Cl.

| | |
|---|---|
| ***G01N 27/404*** | (2006.01) |
| ***G01N 27/409*** | (2006.01) |
| ***G01N 27/414*** | (2006.01) |

(56) References Cited

U.S. PATENT DOCUMENTS

| | | | | |
|---|---|---|---|---|
| 7,022,213 | B1 * | 4/2006 | Austen | G01N 27/404 439/91 |
| 2006/0124458 | A1 | 6/2006 | Nauber et al. | |
| 2019/0025246 | A1 | 1/2019 | Liu et al. | |
| 2019/0277801 | A1 * | 9/2019 | Pratt | G01N 27/4163 |

FOREIGN PATENT DOCUMENTS

| | | | |
|---|---|---|---|
| JP | 11-183433 | A | 7/1999 |
| JP | 2003-507738 | A | 2/2003 |
| JP | 2005-61991 | A | 3/2005 |
| JP | 2007-248313 | A | 9/2007 |
| JP | 2014-153103 | A | 2/2013 |
| JP | 2020-139894 | A | 9/2020 |

OTHER PUBLICATIONS

EPO machine-generated English language translation of JP 2007-248313 A, patent published Sep. 7, 2027 (Year: 2007).*

EPO machine-generated English language translation of JP 2020-0139894 A, patent published Sep. 3, 2020 (Year: 2020).*

EPO machine-generated English language translation of JP 2005-61991 A , patent published Mar. 10, 2005 (Year: 2005).*

International Search Report (ISR), for International Application No. PCT/JP2022/027605, mailed Sep. 27, 2022, 3 pages.

Notification of Transmittal of Translation of the International Preliminary Report on Patentability (IPRP) on Form PCT/IB/338 (1 page) with IPRP Form PCT/IB/373 (1 page) dated Jan. 16, 2024 for International Application. No. PCT/JP2022/027605, and with Form PCT/ISA/237 (1 page) cover sheet with translation of the Written Opinion of the ISA, including Basis of the Opinion (1 page) and Reasoned Statement (1 page) dated Sep. 27, 2022, 5 Pages total.

Machine translation of JP51-93293A, 3 pages.

Machine translation of JP51-107195A, 3 pages.

* cited by examiner

CONSTANT POTENTIAL ELECTROLYTIC GAS SENSOR AND METHOD FOR MANUFACTURING CONSTANT POTENTIAL ELECTROLYTIC GAS SENSOR

TECHNICAL FIELD

The present invention relates to a constant potential electrolytic gas sensor and a method for manufacturing the constant potential electrolytic gas sensor.

BACKGROUND ART

As a sensor for detecting a gas to be detected, for example, a constant potential electrolytic gas sensor as disclosed in Patent Document 1 is used. The constant potential electrolytic gas sensor in Patent Document 1 comprises: a sensor case; a reaction electrode, a counter electrode, and a reference electrode provided on an electrode holder in the sensor case; three connection terminals provided on a lower wall of the sensor case under the electrode holder; and lead wires that connect each electrode and each connection terminal. This constant potential electrolytic gas sensor controls a potential of the reactive electrode relative to the reference electrode to a constant value to detect an electrolytic current generated between the reactive electrode and the counter electrode due to an electrochemical reaction of a gas to be detected, thereby allowing for detection of the gas to be detected.

The constant potential electrolytic gas sensor in Patent Document 1 is manufactured by press-fitting the terminals to which the lead wires are connected into the lower wall of the sensor case, inserting the electrode holder into the sensor case so that the lead wires extend along the side surface of the electrode holder onto the electrode holder, providing each electrode on the electrode holder, and then bending the lead wires along the surface of each electrode to be connected to the surface of each electrode.

PRIOR ART DOCUMENT

Patent Document

Patent Document 1: JP 2014-153103 A

SUMMARY OF THE INVENTION

In the constant potential electrolytic gas sensor, if a connection point where a lead wire is connected to a terminal is immersed into an electrolyte, corrosion occurs at the connection point, which may cause an error in an electrolytic current to be measured. Therefore, it is necessary to apply a protective agent for protecting from corrosion caused by the electrolyte to the connection point where the lead wire is connected to the terminal. However, since the constant potential electrolytic gas sensor in Patent Document 1 is not provided with a structure for holding a predetermined amount of protective agent in the vicinity of the connection point between the lead wire and the terminal, it is difficult to control the amount of protective agent while suppressing the amount of protective agent to be applied. Moreover, since the connection point is located below an electrode holder, it is necessary to apply the protective agent before providing the electrode holder and to bend the lead wire to arrange the lead wire on the surface of each electrode after providing the electrode holder and each electrode. As such, the constant potential electrolytic gas sensor in Patent Document 1 cannot be manufactured easily because it is extremely difficult and complicated for application of the protective agent and wiring of the lead wire, which hinders automation of manufacturing steps.

The present invention has been made in view of the above-described problem, and it is an object of the present invention to provide a constant potential electrolytic gas sensor and a method for manufacturing the constant potential electrolytic gas sensor that allow for easy application of a predetermined amount of protective agent and easy wiring of a lead wire and can be easily manufactured.

The constant potential electrolytic gas sensor of the present invention comprises: a case with a case body; an electrode structure comprising at least two electrodes provided in the case body; at least two lead wires that extend along respective surfaces of the at least two electrodes and are connected to the respective surfaces of the at least two electrodes; and at least two external electrodes that extend from the outside of the case to the inside of the case, are provided in the case body, and are connected to the at least two lead wires, respectively, wherein the at least two external electrodes are arranged so that a connection point of the external electrode to which the lead wire is connected is located at a height corresponding to the electrode structure, and wherein the case body has a holding structure that can hold a predetermined amount of protective agent so as to cover the connection point, with respect to each of the at least two external electrodes.

The method of the present invention is a method for manufacturing a constant potential electrolytic gas sensor, the constant potential electrolytic gas sensor comprising: a case with a case body; an electrode structure comprising at least two electrodes provided in the case body; at least two lead wires that extend along respective surfaces of the at least two electrodes and are connected to the respective surfaces of the at least two electrodes; and at least two external electrodes that extend from the outside of the case to the inside of the case, are provided in the case body, and are connected to the at least two lead wires, respectively, wherein the at least two external electrodes are arranged so that a connection point of the external electrode to which the lead wire is connected is located at a height corresponding to the electrode structure, wherein the case body has a holding structure that can hold a predetermined amount of protective agent so as to cover the connection point, with respect to each of the at least two external electrodes, and wherein the method comprises the steps of: arranging the lead wire between the surface of the electrode and the connection point of the external electrode; connecting the lead wire to the external electrode at the connection point of the external electrode with the lead wire being arranged on the surface of the electrode; and supplying the predetermined amount of protective agent to the holding structure so as to cover the connection point of the external electrode with the protective agent.

EMBODIMENT FOR CARRYING OUT THE INVENTION

Constant potential electrolytic gas sensors relating to some embodiments of the present invention will be described below with reference to the accompanying drawings. However, the embodiments shown below are merely examples, and the constant potential electrolytic gas sensor of the present invention is not limited to the following examples.

Figure 1:
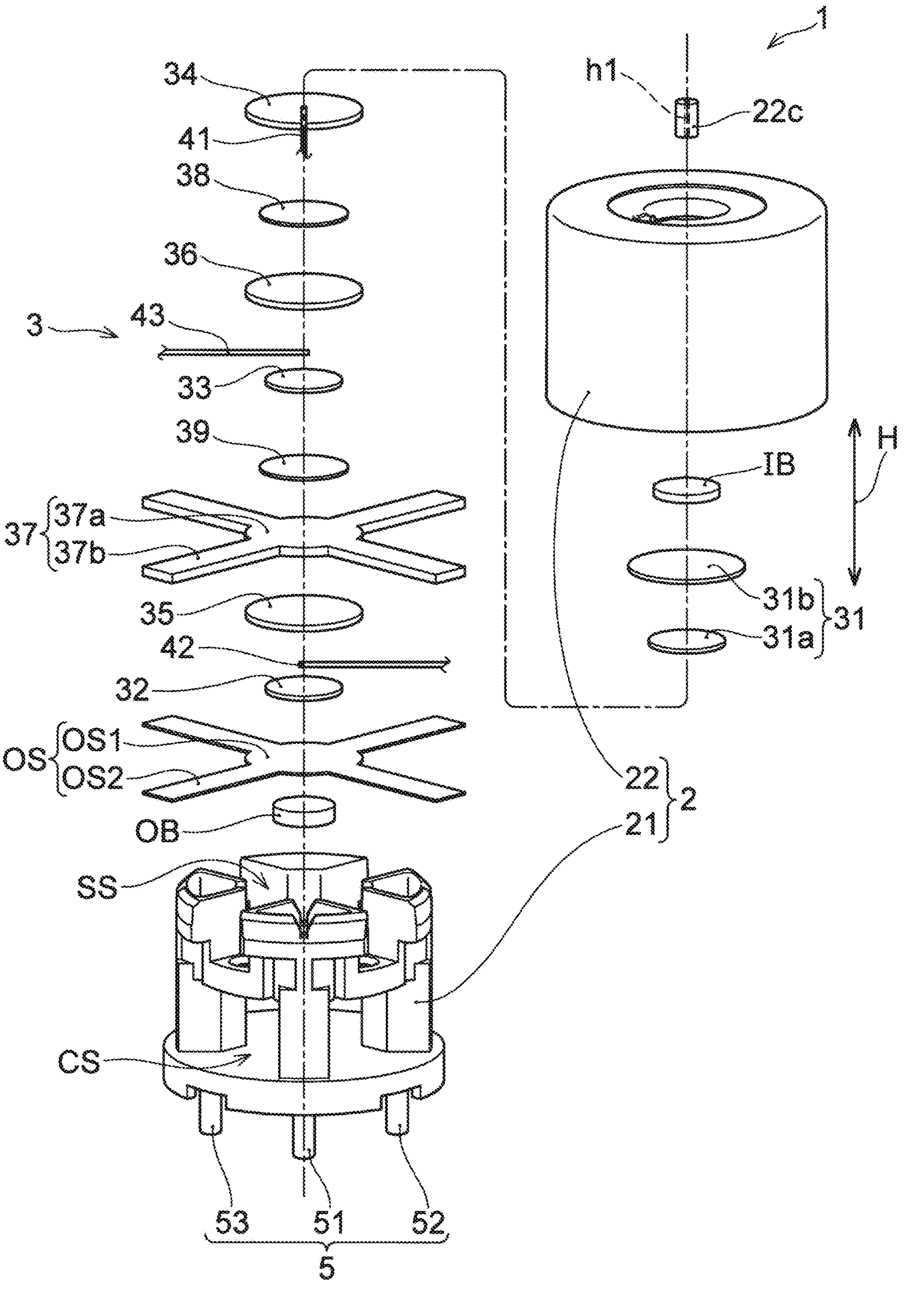
FIG. 1 is an exploded perspective view of a constant potential electrolytic gas sensor according to a first embodiment of the present invention.
Figure 2:
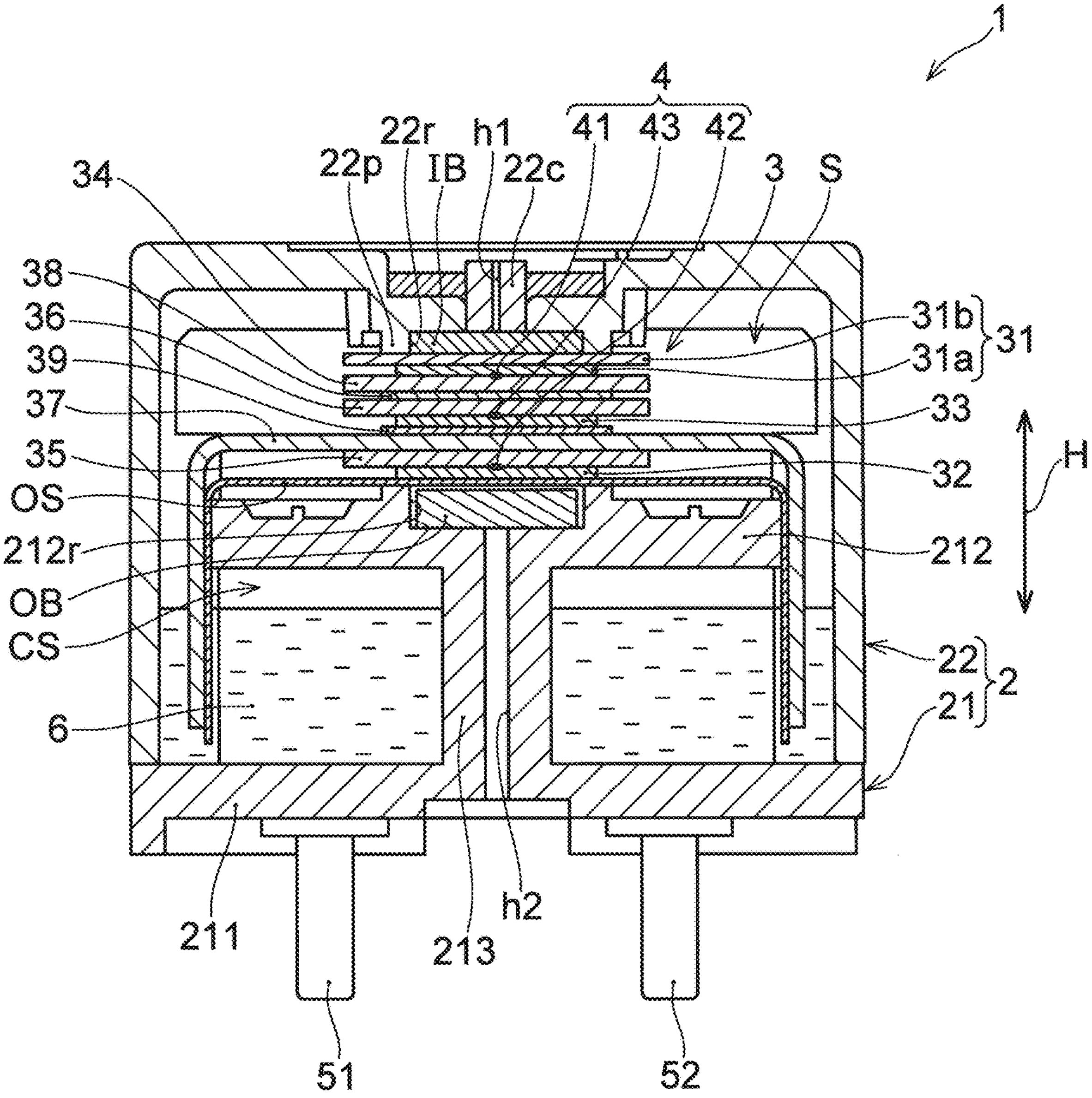
FIG. 2 is a cross-sectional view of the constant potential electrolytic gas sensor in FIG. 1.
Figure 3:
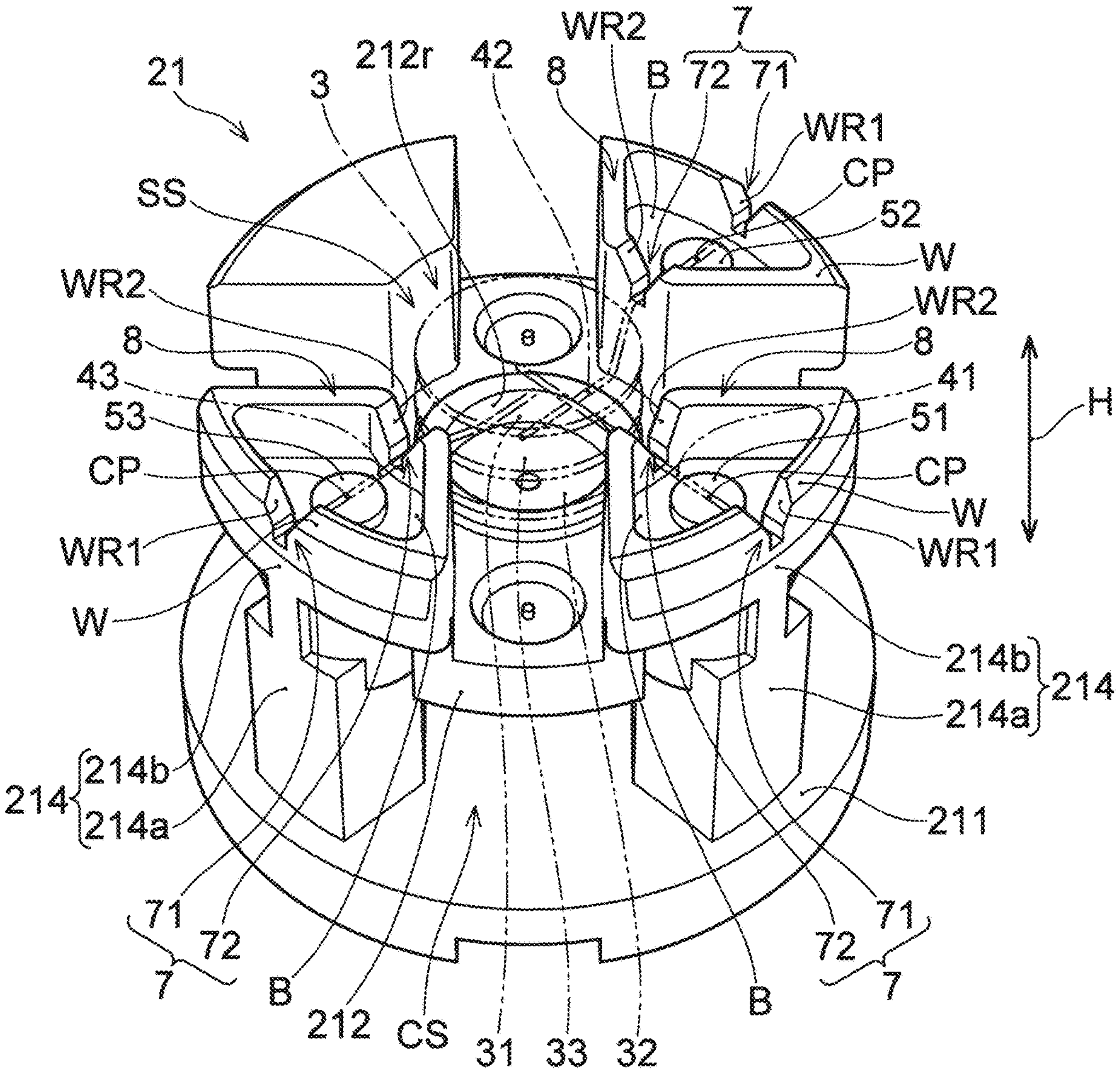
FIG. 3 is a perspective view of a case body of the constant potential electrolytic gas sensor in FIG. 1.

In the present specification, although the term "height direction H" is used, it refers to a direction perpendicular to a surface of a counter electrode 32 or a reaction electrode 31 included in an electrode structure 3, as shown in, for example, FIGS. 1 to 3. Moreover, one side in the height direction H (in the illustrated example, opposite sides to external electrodes 51, 52, 53 with respect to connection points CP of the external electrodes 51, 52, 53 to which lead wires 41, 42, 43 are connected—the upper side in the figure) is defined as an upper side, and the other side in the height direction H (in the illustrated example, sides of the external electrodes 51, 52, 53 with respect to the connection points CP of the external electrodes 51, 52, 53 to which the lead wires 41, 42, 43 are connected—the lower side in the figure) is defined as a lower side. Furthermore, a direction perpendicular to the height direction H is defined as a horizontal direction.

First Embodiment

As shown in FIGS. 1 and 2, the constant potential electrolytic gas sensor 1 of the first embodiment (hereinafter referred to as a "gas sensor 1") comprises a case 2, an electrode structure 3 accommodated in the case 2, a lead wire 4 connected to the electrode structure 3, and an external electrode 5 connected to the lead wire 4. The gas sensor 1 further comprises an electrolyte 6 provided so as to make a contact with the electrode structure 3. The gas sensor 1 is connected via the external electrode 5 to a control device (not shown) such as, for example, a potentiostat. The gas sensor 1 detects a gas to be detected in an atmospheric gas by detecting by the control device an electric signal generated as a result of an electrochemical reaction occurring in the electrode structure 3 with a constant potential applied to the electrode structure 3 by the control device.

The gas to be detected by the gas sensor 1 is not particularly limited, examples of which include an oxygen gas, a hydrogen sulfide gas, an ammonia gas, a nitrogen dioxide gas, a nitrogen trifluoride gas, a chlorine gas, a fluorine gas, an iodine gas, a chlorine trifluoride gas, an ozone gas, a hydrogen peroxide gas, a hydrogen fluoride gas, a hydrogen chloride gas (hydrochloric acid gas), a carbon monoxide gas, a hydrogen gas, a sulfur dioxide gas, a silane gas, a disilane gas, a phosphine gas, a germane gas, and the like. Here, the gas to be detected by the gas sensor 1 of this embodiment is an oxygen gas, and an example in which the gas sensor 1 is configured as an oxygen gas sensor will be described below. However, the configuration of the gas sensor of the present invention can be modified depending on the gas to be detected.

The case 2 is a member that accommodates the electrode structure 3, the lead wire 4, the external electrode 5 extending into the case 2, and the electrolyte 6. The case 2 comprises a case body 21 and a case cover 22, as shown in FIGS. 1 and 2. An internal space S for accommodating the above-described members is formed within the case 2 by closing the case body 21 with the case cover 22. In particular, in this embodiment, an electrolyte-accommodating space CS for accommodating the electrolyte 6 is formed within the case 2 by closing the case body 21 with the case cover 22. The internal space S is liquid-tightly sealed by air-permeable sheets 31*b*, OS, and buffer films IB, OB, which will be described below, so that a gas can flow in and out the case 2. The case body 21 and the case cover 22 are fixed to each other by a known adhesive means such as, for example, ultrasonic welding and an adhesive. The case body 21 and the case cover 22 are not particularly limited, and can be formed using, for example, known resin materials or various resin-like materials by a known resin molding or cutting technique.

Figure 4:
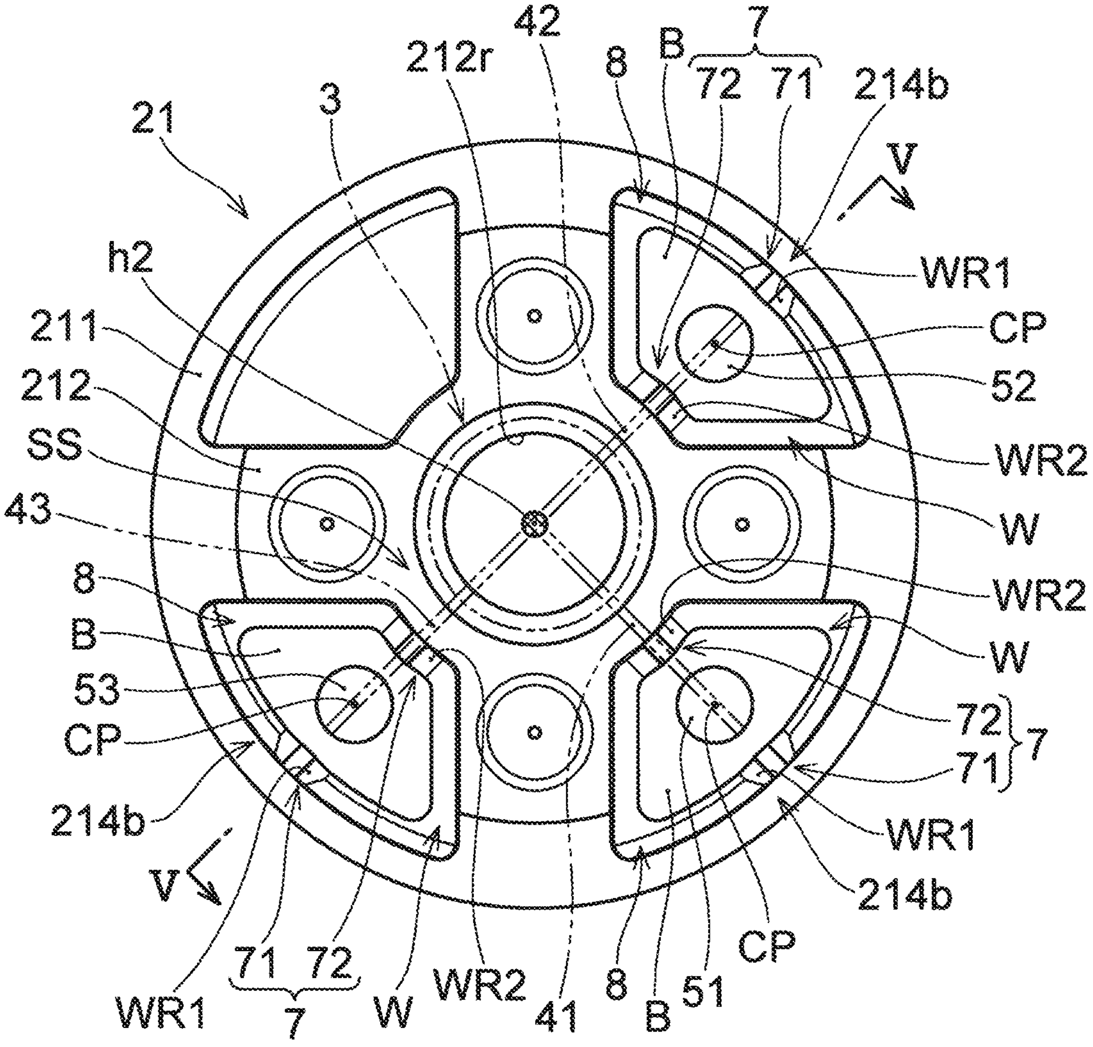
FIG. 4 is a top view of the case body of the constant potential electrolytic gas sensor in FIG. 1.

The case body 21 is a member that supports the electrode structure 3, the lead wire 4, the external electrode 5, and the electrolyte 6. A structure of the case body 21 is not particularly limited as long as the case body 21 can support the above-described members. In this embodiment, the case body 21 comprises a base 211, an electrode structure support 212, an intermediate support 213, and a plurality of external electrode supports 214, as shown in FIGS. 2 to 4. The case body 21 is molded so that the base 211, the electrode structure support 212, the intermediate support 213, and the external electrode supports 214 are integrated. In particular, in this embodiment, the case body 21 is also molded integrally with the external electrode 5 by insert molding. Thereby, a step of attaching the external electrode 5 to the case body 21 can be omitted. However, each part of the case body 21 may be fixed to each other after formed separately.

The base 211 is a part that supports the electrode structure support 212, the intermediate support 213, and the external electrode supports 214. The base 211 further supports the electrolyte 6 accommodated in the electrolyte-accommodating space CS formed by closing the case body 21 with the case cover 22. As shown in FIGS. 2 to 4, the base 211 is formed into a flat plate shape (substantially a disk shape in the illustrated example), where the intermediate support 213 is fixed substantially at the center of the flat plate surface (upper surface), and the plurality of external electrode supports 214 are fixed at substantially equal intervals away from each other along the peripheral edge of the flat plate surface. A gas outflow hole h2 is formed in the base 211 and is continuously provided penetrating the electrode structure support 212 and the intermediate support 213. A gas flows out from the internal space S formed inside the case 2 through the gas outflow hole h2 formed continuously in the electrode structure support 212, the intermediate support 213, and the base 211.

The electrode structure support 212 is a part that supports the electrode structure 3 and the lead wire 4 connected to the electrode structure 3. The electrode structure support 212 is supported by the intermediate support 213 and the external electrode supports 214 with respect to the base 211. As shown in FIGS. 2 to 4, the electrode structure support 212 is formed into a flat plate shape, where the intermediate support 213 is fixed substantially at the center of the flat plate bottom surface (lower surface), and the plurality of external electrode supports 214 are fixed at substantially equal intervals away from each other along the peripheral edge of the flat plate. An electrode structure-supporting space SS (see FIGS. 1 and 3) for supporting the electrode structure 3, which is surrounded by the plurality of external electrode supports 214, is formed above substantially the center of the flat plate surface of the electrode structure support 212. A recess 212*r* provided with an outflow-side buffer film OB is formed on the surface of the electrode structure support 212 below the electrode structure-supporting space SS, and the gas outflow hole h2 continuously provided in the intermediate support 213 and the base 211 is formed below the recess 212*r*.

The outflow-side buffer film OB provided in the recess 212*r* of the electrode structure support 212, together with an outflow-side air-permeable sheet OS, has functions of suppressing outflow of the electrolyte 6 through the gas outflow hole h2 and adjusting pressure within the case 2. As shown in FIG. 2, the outflow-side buffer film OB is held in the recess 212*r* by closing an opening of the recess 212*r* of the electrode structure support 212 with the outflow-side air-permeable sheet OS. As the outflow-side buffer film OB, a film that suppresses passage of liquid and allows passage of gas can be used, for example, a porous film made of a fluororesin such as polytetrafluoroethylene (PTFE), or the like is used.

The outflow-side air-permeable sheet OS, together with the outflow-side buffer film OB, liquid-tightly seals the gas outflow hole h2 of the electrode structure support 212. As shown in FIG. 1, the outflow-side air-permeable sheet OS comprises a sheet-shaped (in the illustrated example, substantially a circular sheet-shaped) main body OS1, and a plurality of (four in the illustrated example) sheet-shaped (in the illustrated example, substantially rectangular sheet-shaped) extension parts OS2 that protrude in an out-of-plane direction from the main body OS1 and are arranged at substantially equal intervals from each other in a circumferential direction of the main body OS1. The main body OS1 is arranged in the electrode structure-supporting space SS above the electrode structure support 212. The extension part OS2 is arranged so as to extend along the surface of the electrode structure support 212 through a gap between the adjacent external electrode supports 214, 214, and, as shown in FIG. 2, so as to extend into the electrolyte-accommodating space CS with being bent at the outer edge of the electrode structure support 212. The outflow-side air-permeable sheet OS is thermally fused in a ring shape on the surface of the electrode structure support 212 located outside the outer periphery of the recess 212*r* of the electrode structure support 212, so that it is fixed to the surface of the electrode structure support 212 so as to close the recess 212*r* of the electrode structure support 212. As the outflow-side air-permeable sheet OS, a sheet that suppresses passage of liquid and allows passage of gas can be used, for example, a porous sheet made of a fluororesin such as polytetrafluoroethylene (PTFE), or the like is used.

The intermediate support 213 is a part that supports the electrode structure support 212 with respect to the base 211. As shown in FIG. 2, the intermediate support 213 is formed in a columnar shape so as to extend from substantially the center of the flat plate surface of the base 211 in the height direction H, where the intermediate support 213 is fixed to the base 211 at the lower end of the intermediate support 213 in the height direction H and fixed to the electrode structure support 212 at the upper end of the intermediate support 213 in the height direction H. The gas outflow hole h2 that extends continuously from the electrode structure support 212 penetrating the base 211 via the intermediate support 213 is formed in the intermediate support 213.

The external electrode support 214 is a part that supports the external electrode 5 and the lead wire 4 connected to the external electrode 5. The external electrode support 214 further supports the electrode structure support 212 with respect to the base 211. As shown in FIG. 3, the external electrode support 214 is formed in a columnar shape extending along the height direction H from the vicinity of the peripheral edge of the flat plate surface of the base 211, where the external electrode support 214 is fixed to the base 211 at the lower end of the external electrode support 214 in the height direction H and fixed to the electrode structure support 212 at the intermediate position of the external electrode support 214 in the height direction H. The external electrode 5 extending along the height direction H of the external electrode support 214 and penetrating the external electrode support 214 is fixed to the external electrode support 214. A plurality of external electrode supports 214 (three in the illustrated example) are provided depending on the number of external electrodes 5 required, where the plurality of external electrode supports 214 are arranged at substantially equal intervals from each other along the peripheral edge of the flat plate surface of the base 211. Here, in the illustrated example, one support that has substantially the same shape as the external electrode support 214 and does not support the external electrode 5 is provided. Four supports including this support are arranged at substantially equal intervals from each other along the peripheral edge of the flat plate surface of the base 211.

As shown in FIG. 3, the external electrode support 214 comprises a lower external electrode support 214*a* located below the electrode structure support 212 in the height direction H and an upper external electrode support 214*b* located above the electrode structure support 212 in the height direction H. The lower external electrode support 214*a* supports the external electrode 5 and also supports the electrode structure support 212. The upper external electrode support 214*b* supports the external electrode 5 and also positions a connection point CP (for example, the upper end of the external electrode 5) of the external electrode 5 with the lead wire 4 at a height corresponding to the electrode structure 3. In connection with a fact that the connection point CP of the external electrode 5 is provided on the upper external electrode support 214*b*, the upper external electrode support 214*b* may comprise a guide 7 that guides the lead wire 4 and a holding structure 8 that can hold a protective agent for protecting the connection point CP of the external electrode 5. Details of the guide 7 and the holding structure 8 will be described in detail below.

As shown in FIGS. 3 and 4, the upper external electrode support 214*b* is formed into substantially a fan shape with a radially-inner part cut out in substantially a concentric circle when viewed in the height direction H. Thereby, the electrode structure-supporting space SS is formed in substantially a cylindrical shape, where the electrode structure 3 is supported by being surrounded by the plurality of upper external electrode supports 214*b*, on the surface of the electrode structure support 212 on the inner side in the horizontal direction with respect to the upper external electrode supports 214*b*. The upper external electrode supports 214*b* that surround the electrode structure-supporting space SS restrict the electrode structure 3 supported within the electrode structure-supporting space SS from deviating to the outside of the electrode structure-supporting space SS in the horizontal direction. The plurality of upper external electrode supports 214*b* are arranged at substantially equal intervals away from each other along the peripheral edge of the electrode structure-supporting space SS. A gap extending from substantially the center of the flat plate surface of the electrode structure support 212 to the peripheral edge of the electrode structure support 212 is formed between the adjacent upper external electrode supports 214*b*, 214*b*. This gap is formed in a size corresponding to the extension part OS2 of the above-described outflow-side air-permeable sheet OS (see FIG. 1) and an extension part 37*b* of an electrolyte-holding member for electrolyte supply 37, which will be described below, included in the electrode structure 3 (see FIG. 1). Rotation movements about an axis extending in the height direction H of the outflow-side air-permeable sheet OS and the electrolyte-holding member for electrolyte supply 37 are regulated by arranging the respective extension parts OS2, 37*b* within this gap.

The case cover 22 is a member that closes the case body 21 so as to form the internal space S within the case 2. In this embodiment, the case cover 22 is formed into a cylindrical shape with one end (upper end) thereof closed, as shown in FIGS. 1 and 2. The case cover 22 is fixed to the base 211 of the case body 21 so as to cover and hide the electrode structure support 212, the intermediate support 213, and the external electrode supports 214 of the case body 21 within the cylinder. When the case body 21 is closed by the case cover 22, the internal space S is formed, and at the same time, the electrolyte-accommodating space CS is formed between the inner side surface of the case cover 22, and the base 211 and the electrode structure support 212 of the case body 21.

As shown in FIGS. 1 and 2, a capillary member 22*c* having a gas inflow hole h1 drilled is fixed to a wall on one-end side (upper wall) of the case cover 22 with an adhesive, an elastic material (packing, thermoplastic elastomer, etc.), or the like. A gas containing a gas to be detected outside the case 2 flows toward the reaction electrode 31 inside the case 2 through the gas inflow hole h1. Here, the gas inflow hole h1 has to be configured to limit an amount of gas to be detected flowing into the case 2 to a predetermined amount or less in order to suppress signal strength when the electrode structure 3 detects the gas to be detected. For that purpose, it is necessary to make the diameter of the gas inflow hole h1 as small as possible (for example, 50 μmφ). Where the case cover 22 is formed into a cylindrical shape with one end thereof closed, for example by resin molding, as in this embodiment, such fine gas inflow hole is difficult to be provided on the wall on one-end side of the case cover 22 at the same time as resin molding. By fixing the capillary member 22*c* having the fine gas inflow hole h1, which is drilled in advance, to the molded case cover 22, the fine gas inflow hole h1 can be easily provided in the case cover 22.

As shown in FIG. 2, a recess 22*r*, in which an inflow-side buffer film IB is provided, is formed inside the upper wall of the case cover 22. The inflow-side buffer film IB provided in the recess 22*r*, together with an air-permeable sheet 31*b* which will be described below, has functions of suppressing the electrolyte 6 from flowing out through the gas inflow hole h1 and adjusting the pressure inside the case 2. The inflow-side buffer film IB is fixed in the recess 22*r* of the case cover 2 by a known fixing means such as, for example, a donut-shaped double-sided tape. As the inflow-side buffer film IB, a film that suppresses passage of liquid and allows passage of gas can be used, for example, a porous film made of a fluororesin such as polytetrafluoroethylene (PTFE), or the like is used.

The electrode structure 3 detects a gas to be detected by causing an electrochemical reaction related to a gas to be detected in the electrolyte 6. The electrode structure 3 is provided in the case body 21, but its arrangement is not particularly limited. In this embodiment, as shown in FIGS. 1 to 4, the electrode structure 3 is arranged in the electrode structure-supporting space SS formed on the electrode structure support 212 and is sandwiched between the electrode structure support 212 and the upper wall of the case cover 22 to be supported within the case 2. The electrode structure 3 is formed in a size corresponding to the electrode structure-supporting space SS and restricted from deviating to the outside of the electrode structure-supporting space SS in the horizontal direction by the plurality of external electrode supports 214 arranged around the electrode structure-supporting space SS. Here, in FIGS. 3 and 4, illustrations of other components included in the electrode structure 3 are omitted in order to make it easier to view arrangements of electrodes 31, 32, 33 in the electrode structure 3.

In this embodiment, as shown in FIGS. 1 and 2, the electrode structure 3 comprises a reaction electrode 31 that causes an electrochemical reaction related to a gas to be detected, a counter electrode 32 that causes another electrochemical reaction corresponding to the electrochemical reaction related to the gas to be detected, and a reference electrode 33 that serves as a basis for a potential of the reaction electrode 31. The reaction electrode 31, the counter electrode 32, and the reference electrode 33 are arranged so as to make a contact with the electrolyte 6 and are electrically connected to the external electrode 5 via the lead wire 4, respectively. Here, the electrode structure 3 only needs to be configured to detect the gas to be detected through the electrochemical reaction related to the gas to be detected, and for that purpose, to comprise at least two electrodes, that is, the reaction electrode 31 and the counter electrode 32.

A configuration and an arrangement of the reaction electrode 31 are not particularly limited as long as the reaction electrode 31 can cause the electrochemical reaction related to the gas to be detected in the electrolyte 6. In this embodiment, the reaction electrode 31 comprises a film-shaped (in the illustrated example, substantially a circular film-shaped) catalyst layer 31*a* that has a surface substantially perpendicular to the height direction H and an air-permeable sheet 31*b* that supports the catalyst layer 31*a*, as shown in FIGS. 1 and 2. The reaction electrode 31 is fixed to the case cover 22 through the air-permeable sheet 31*b*. The reaction electrode 31 is incorporated into the electrode structure 3 by closing the case body 21 with the case cover 22. Below the reaction electrode 31 in the height direction H, the reference electrode 33 and the counter electrode 32 are laminated in order at an interval from the reaction electrode 31. The surface of the catalyst layer 31*a* of the reaction electrode 31 is connected to a lead wire for reaction electrode 41 which will be described below. The reaction electrode 31 is formed by film-making the catalyst layer 31*a* on the air-permeable sheet 31*b* using a known electrode material such as, for example, platinum, by a known film-making technique such as coating, vapor deposition, and sputtering. The catalyst layer 31*a* of the reaction electrode 31 is formed so as to have substantially the same shape and surface area (area of a surface facing the height direction H) as the counter electrode 32 and the reference electrode 33.

The air-permeable sheet 31*b* of the reaction electrode 31 liquid-tightly seals the gas inflow hole h1 together with the inflow-side buffer film IB. As shown in FIG. 2, the air-permeable sheet 31*b* is thermally fused to a ring-shaped protrusion 22*p* provided on the outer periphery of the recess 22*r* of the case cover 22, so that the air-permeable sheet 31*b* is fixed to the case cover 22 so as to close the recess 22*r*. The air-permeable sheet 31*b* is configured as a sheet that suppresses passage of liquid and allows passage of gas and configured as, for example, a porous sheet made of a fluororesin such as polytetrafluoroethylene (PTFE).

A configuration and an arrangement of the counter electrode 32 are not particularly limited as long as the counter electrode 32 can cause another electrochemical reaction corresponding to the electrochemical reaction related to the gas to be detected. In this embodiment, as shown in FIGS. 1 and 2, the counter electrode 32 is formed into a film shape (in the illustrated example, substantially a circular film shape) that has a surface substantially perpendicular to the height direction H and arranged on the main body OS1 of the outflow-side air-permeable sheet OS. Above the counter electrode 32 in the height direction H, the reference electrode 33 and the reaction electrode 31 are laminated in order at an interval from the counter electrode 32. However, the counter electrode 32 may be arranged side by side with the reaction electrode 31 or the reference electrode 33 at substantially the same height in the height direction H. The surface of the counter electrode 32 is connected to a lead wire for counter electrode 42 which will be described below. The counter electrode 32 is supported on the outflow-side air-permeable sheet OS by being pressed by the case cover 22 through components on the counter electrode 32. For example, like the reaction electrode 31, the counter electrode 32 can be formed by film-making a known electrode material such as platinum on an air-permeable sheet (not shown) of the same type as the air-permeable sheet 31*b* by a known film-making technique.

A configuration and an arrangement of the reference electrode 33 are not particularly limited as long as the reference electrode 33 can serve as a basis for a potential of the reaction electrode 31. In this embodiment, the reference electrode 33 is formed in a film shape (in the illustrated example, substantially a circular film shape) that has a surface substantially perpendicular to the height direction H, and laminated between the reaction electrode 31 and the counter electrode 32 in the height direction H along the height direction H at an interval therefrom. However, the reference electrode 33 may be arranged, for example, side by side with the reaction electrode 31 or the counter electrode 32 at substantially the same height in the height direction H. The surface of the reference electrode 33 is connected to a lead wire for reference electrode 43 which will be described below. The reference electrode 33 is supported between the reaction electrode 31 and the counter electrode 32 by being sandwiched between upper and lower components of the reference electrode 33 in the height direction H. For example, like the reaction electrode 31, the reference electrode 33 can be formed by film-making a known electrode material such as platinum on an air-permeable sheet (not shown) of the same type as the air-permeable sheet 31*b* by a known film-making technique.

In the gas sensor 1 of this embodiment, a constant voltage is applied to the reaction electrode 31 with reference to a potential of the reference electrode 33 by a control device such as a potentiostat (not shown) connected to the external electrode 5 so that a constant potential difference is applied between the reaction electrode 31 and the reference electrode 33. The reaction electrode 31 between which and the reference electrode 33 a constant potential difference is applied causes an electrochemical reaction related to a gas to be detected when the gas to be detected flows onto the reaction electrode 31. When the electrochemical reaction related to the gas to be detected occurs, another electrochemical reaction also occurs on the counter electrode 32 side in response to the electrochemical reaction. As a result of the electrochemical reactions that occur on the reaction electrode 31 and the counter electrode 32, an electrolytic voltage is generated and electrolytic current flow between the reaction electrode 31 and the counter electrode 32. By detecting the electrolytic current at this time, the gas to be detected can be detected, and a concentration of the gas to be detected can be calculated according to a magnitude of the electrolytic current.

The reaction electrode 31, the counter electrode 32, and the reference electrode 33 of the electrode structure 3 only need to be arranged at least so as to make a contact with the electrolyte 6, and a method of making a contact with the electrolyte 6 is not particularly limited. In this embodiment, the electrode structure 3 comprises electrolyte-holding members 34, 35, 36, 37 capable of holding the electrolyte 6, as shown in FIGS. 1 and 2. The reaction electrode 31, the counter electrode 32, and the reference electrode 33 are arranged so as to make a contact with the electrolyte 6, held by the electrolyte-holding members 34, 35, 36, 37, through the electrolyte-holding members 34, 35, 36, 37. However, the reaction electrode 31, the counter electrode 32, and the reference electrode 33 may be arranged so as to make a direct contact with the electrolyte 6.

The electrolyte-holding members 34, 35, 36, 37 are configured to hold the electrolyte 6 and bring the held electrolyte 6 into contact with the reaction electrode 31, the counter electrode 32, and the reference electrode 33. In this embodiment, the electrolyte-holding members include an electrolyte-holding member for reaction electrode 34, an electrolyte-holding member for counter electrode 35, an electrolyte-holding member for reference electrode 36, and an electrolyte-holding member for electrolyte supply 37, as shown in FIGS. 1 and 2. The respective electrolyte-holding members 34, 35, 36, 37 are arranged so as to make a contact with each other and arranged so as to indirectly connect the reaction electrode 31, the counter electrode 32, and the reference electrode 33 to each other through the held electrolyte 6. The electrolyte-holding member for reaction electrode 34, the electrolyte-holding member for counter electrode 35, the electrolyte-holding member for reference electrode 36, and a main body 37*a*, which will be described below, of the electrolyte-holding member for electrolyte supply 37 are formed to have substantially the same shape and size with each other, have the largest surface area (area of the surface facing the height direction H) among the components of the electrode structure 3, and define the outer edge of the electrode structure 3. Here, in FIG. 2, the respective electrolyte-holding members 34, 35, 36, 37 (particularly the electrolyte-holding members 34, 36, 37) are shown to be spaced apart from each other in order to make the laminated structure of the electrode structure 3 easier to be understood. However, indeed, ring-shaped parts of the respective electrolyte-holding members 34, 35, 36, 37 that extend out of the plane of the respective electrodes 31, 32, 33 are in contact with each other.

As shown in FIGS. 1 and 2, the electrolyte-holding member for reaction electrode 34 makes a contact with the reaction electrode 31 and brings the held electrolyte 6 into contact with the reaction electrode 31. The electrolyte-holding member for reaction electrode 34 is formed into a sheet shape (in the illustrated example, substantially a circular sheet shape) and arranged between the reaction electrode 31 and the reference electrode 33 in the height direction H so as to make a surface contact with the surface of the reaction electrode 31. The electrolyte-holding member for reaction electrode 34 has a larger surface area (area of the surface facing the height direction H) than each of the electrodes 31, 32, 33. The electrolyte-holding member for reaction electrode 34 is arranged so as to make a contact with the electrolyte-holding member for reference electrode 36 at a part extending in a ring shape out of the plane of each electrode 31, 32, 33. The electrolyte-holding member for reaction electrode 34 makes a contact with the electrolyte-holding member for reference electrode 36, and thereby, is supplied with the electrolyte 6 from the electrolyte-holding member for reference electrode 36. Here, although the electrolyte-holding member for reaction electrode 34 is in substantially a circular sheet shape in the illustrated example, the electrolyte-holding member for reaction electrode 34 may comprise a sheet-shaped (e.g., substantially circular sheet-shaped) main body and a sheet-shaped) extension parts that protrude from the main body in an out-of-plane direction and are arranged at substantially equal intervals from each other in the circumferential direction of the main body, in a similar manner as the electrolyte-holding member for electrolyte supply 37 which will be described below.

As shown in FIGS. 1 and 2, the electrolyte-holding member for counter electrode 35 makes a contact with the counter electrode 32 and brings the held electrolyte 6 into contact with the counter electrode 32. Moreover, as shown in FIGS. 1 and 2, the electrolyte-holding member for counter electrode 35 is arranged between the counter electrode 32 and the electrolyte-holding member for electrolyte supply 37 in the height direction H so that the electrolyte-holding member for counter electrode 35 makes a surface contact with the surface of the counter electrode 32 and the surface of the main body 37*a* of the electrolyte-holding member electrolyte supply 37. The electrolyte-holding member for counter electrode 35 has a larger surface area (area of the surface facing the height direction H) than each of the electrodes 31, 32, 33. The electrolyte-holding member for counter electrode 35 makes a contact with the main body 37*a* of the electrolyte-holding member for electrolyte supply 37, and thereby, is supplied with the electrolyte 6 from the electrolyte-holding member for electrolyte supply 37. Here, although the electrolyte-holding member for counter electrode 35 is in substantially a circular sheet shape in the illustrated example, the electrolyte-holding member for counter electrode 35 may comprise a sheet-shaped (e.g., substantially circular sheet-shaped) main body and a plurality of (e.g., four) sheet-shaped (e.g., substantially rectangular sheet-shaped) extension parts that protrude from the main body in an out-of-plane direction and are arranged at substantially equal intervals from each other in the circumferential direction of the main body, in a similar manner as the electrolyte-holding member for electrolyte supply 37 which will be described below.

As shown in FIGS. 1 and 2, the electrolyte-holding member for reference electrode 36 makes a contact with the reference electrode 33 and brings the held electrolyte 6 into contact with the reference electrode 33. The electrolyte-holding member for reference electrode 36 is formed in a sheet shape (in the illustrated example, substantially a circular sheet shape) and arranged between the reaction electrode 31 and the reference electrode 33 in the height direction H so as to make a surface contact with the surface of the reference electrode 33. The electrolyte-holding member for reference electrode 36 has a larger surface area (area of the surface facing the height direction H) than each of the electrodes 31, 32, 33. The electrolyte-holding member for reference electrode 36 is arranged so as to make a contact with the electrolyte-holding member for reaction electrode 34 and the main body 37*a* of the electrolyte-holding member for electrolyte supply 37 at a part extending in a ring shape out of the plane of each electrode 31, 32, 33. The electrolyte-holding member for reference electrode 36 makes a contact with the electrolyte-holding member for reaction electrode 34 and the main body 37*a* of the electrolyte-holding member for electrolyte supply 37, and thereby, is supplied with the electrolyte 6 from the main body 37*a* of the electrolyte-holding member for electrolyte supply 37 and supplies the electrolyte 6 to the electrolyte-holding member for reaction electrode 34. Here, although the electrolyte-holding member for reference electrode 36 is in substantially a circular sheet shape in the illustrated example, the electrolyte-holding member for reference electrode 36 may comprise a sheet-shaped (e.g., substantially circular sheet-shaped) main body and a sheet-shaped) extension parts that protrude from the main body in an out-of-plane direction and are arranged at substantially equal intervals from each other in the circumferential direction of the main body, in a similar manner as the electrolyte-holding member for electrolyte supply 37 which will be described below.

The electrolyte-holding member for electrolyte supply 37 makes a direct contact with the electrolyte 6 in the electrolyte-accommodating space CS and causes the electrolyte 6 in the electrolyte-accommodating space CS to permeate into the electrolyte-holding member for electrolyte supply 37, while at the same time supplying the permeated electrolyte 6 to the other electrolyte-holding members 34, 35, 36. The electrolyte-holding member for electrolyte supply 37 comprises a sheet-shaped (in the illustrated example, substantially a circular sheet-shaped) main body 37*a* that constitutes a part of the electrode structure 3, and a plurality of (four in the illustrated example) sheet-shaped (in the illustrated example, substantially rectangular sheet-shaped) extension parts 37*b* that protrude in an out-of-plane direction from the main body 37*a* and are arranged at substantially equal intervals from each other in a circumferential direction of the main body 37*a*. The electrolyte-holding member for electrolyte supply 37 is formed to have substantially the same shape and size as the outflow-side air-permeable sheet OS and arranged so as to overlap on the outflow-side air-permeable sheet OS with the counter electrode 32 and the electrolyte-holding member for counter electrode 35 being sandwiched therebetween.

As shown in FIGS. 1 and 2, the extension part 37*b* of the electrolyte-holding member for electrolyte supply 37 extends along the surface of the electrode structure support 212 through a gap between the adjacent external electrode supports 214, 214 and is arranged so as to extend into the electrolyte-accommodating space CS with being bent at the outer edge of the electrode structure support 212. The extension part 37*b* extending into the electrolyte-accommodating space CS makes a direct contact with the electrolyte 6 in the electrolyte-accommodating space CS to supply the electrolyte 6 from the extension part 37*b* to the main body 37*a*.

Each of the electrolyte-holding members 34, 35, 36, 37 is formed of a material that has an electrical insulation property and water absorption property, and can be composed of, without particular limitation, a filter paper, etc. formed of, for example, silica fiber, cellulose fiber, glass fiber, etc.

The electrode structure 3 may comprise support sheets 38, 39, as shown in FIGS. 1 and 2. The support sheets 38, 39 are laminated in the electrode structure 3 and used to suppress a poor contact with each other by pressing the lead wire for reaction electrode 41, the lead wire for counter electrode 42, and the lead wire for reference electrode 43, respectively, onto the reaction electrode 31, the counter electrode 32, and the reference electrode 33. The support sheets 38, 39 are each formed into a sheet shape (substantially circular sheet shape in the illustrated example) having a predetermined rigidity and laminated between the electrolyte-holding member for reaction electrode 34 and the electrolyte-holding member for reference electrode 36 in the height direction H and between the reference electrode 33 and the electrolyte-holding member for electrolyte supply 37 in the height direction H. The support sheets 38, 39 are formed to have a slightly larger surface area (area of the surface facing the height direction H) than the reaction electrode 31, the counter electrode 32, and the reference electrode 33, and configured to apply a pressing force to the entire surface of each of the reaction electrode 31, the counter electrode 32, and the reference electrode 33. Moreover, the support sheets 38, 39 have a smaller surface area (area of the surface facing the height direction H) than the electrolyte-holding member for reaction electrode 34, the electrolyte-holding member for reference electrode 36, and the main body 37*a* of the electrolyte-holding member for electrolyte supply 37, so that the support sheets 38, 39 are configured so as not to hinder contacts between the respective electrolyte-holding members. The support sheets 38, 39 can be formed of, for example, polyethylene naphthalate (PEN), etc.

The electrolyte 6 is a solution that has electrical conductivity and makes a contact with the electrode structure 3 to cause an electrochemical reaction related to a gas to be detected. In this embodiment, as shown in FIG. 2, the electrolyte 6 is accommodated in the electrolyte-accommodating space CS within the case 2 so as to make a contact with the electrode structure 3 via the electrolyte-holding members 34, 35, 36, 37. The electrolyte 6 can be selected as appropriate depending on a type of gas to be detected and a type of electrode structure 3 used for detection, and for example, an acidic aqueous solution such as sulfuric acid and phosphoric acid, a neutral salt aqueous solution such as lithium bromide and calcium chloride, and the like can be used. Moreover, as the electrolyte 6, a molten salt mainly composed of a nitrogen-containing aromatic cation or an aliphatic onium cation, and a fluorine-containing anion, which is in a liquid state at a normal temperature, can also be used. As the nitrogen-containing aromatic cation, for example, an alkylimidazolium ion or an alkylpyridinium ion is used. Furthermore, as the above-described fluorine-containing anion, for example, a borofluoride ion, a phosphorus fluoride ion, or a trifluoromethanesulfonic acid ion is used.

The lead wire 4 is a member that electrically connects the electrode structure 3 and the external electrode 5. In this embodiment, as the lead wire 4, a lead wire for reaction electrode 41, a lead wire for counter electrode 42, and a lead wire for reference electrode 43 are provided, corresponding to the reaction electrode 31, the counter electrode 32, and the reference electrode 33 of the electrode structure 3, as shown in FIGS. 1 and 2. The lead wire for reaction electrode 41, the lead wire for counter electrode 42, and the lead wire for reference electrode 43, at one end sides thereof, extend along the surfaces of the reaction electrode 31, the counter electrode 32, and the reference electrode 33, respectively, and are electrically connected to the respective surfaces of the reaction electrode 31, the counter electrode 32, and the reference electrode 33. Moreover, the lead wire for reaction electrode 41, the lead wire for counter electrode 42, and the lead wire for reference electrode 43, at the other end sides thereof, are connected to an external electrode for reaction electrode 51, an external electrode for counter electrode 52, and an external electrode for reference electrode 53, which will be described below, of the external electrode 5, respectively.

The lead wires 41, 42, 43 are each formed into a wire or ribbon shape with metal such as platinum, gold, tungsten, tantalum, and the like. Here, although three lead wires 41, 42, 43 are provided in this embodiment, the gas sensor 1 only needs to comprise at least two electrodes, that is, the reaction electrode 31 and the counter electrode 32, as described above, and accordingly, the gas sensor 1 only needs to comprise at least two lead wires, that is, the lead wire for reaction electrode 41 and the lead wire for counter electrode 42.

The external electrode 5 applies a voltage for causing an electrochemical reaction related to a gas to be detected from a control device (not shown) such as a potentiostat located outside the case 2 to the electrode structure 3 located inside the case 2 and transmits an electrical signal generated by the electrochemical reaction related to the gas to be detected from the electrode structure 3 to the control device. In this embodiment, as the external electrode 5, an external electrode for reaction electrode 51, an external electrode for counter electrode 52, and an external electrode for reference electrode 53 are provided, corresponding to the reaction electrode 31, the counter electrode 32, and the reference electrode 33 of the electrode structure 3, as shown in FIG. 1. The respective external electrodes 51, 52, 53 extend from the outside of the case 2 to the inside of the case 2 and are provided in the case body 21. More specifically, the respective external electrodes 51, 52, 53 extend along the height direction H from below the base 211 of the case body 21 and are provided in the external electrode supports 214 of the case body 21 so as to protrude above the external electrode supports 214. The external electrodes 51, 52, 53 are electrically connected, on one end sides thereof (parts protruding upward from the external electrode supports 214), to the lead wire for reaction electrode 41, the lead wire for counter electrode 42, and the lead wire for reference electrode 43, respectively (see FIG. 3), and electrically connected, on the other end sides thereof (parts protruding downward from the base 211), to the control device (not shown). In this embodiment, as shown in FIG. 4, the external electrodes 51, 52, 53 are arranged so that the external electrode for reaction electrode 51 is located to be spaced apart from substantially an intermediate position between the external electrode for counter electrode 52 and the external electrode for reference electrode 53 in a horizontal direction substantially perpendicular to a straight line connecting the external electrode for counter electrode 52 and the external electrode for reference electrode 53. Here, although the external electrodes 51, 52, 53 are provided so as to extend along the height direction H in this embodiment, the external electrodes 51, 52, 53 may be provided so as to extend along a direction different from the height direction H, such as, for example, a horizontal direction.

Figure 5:
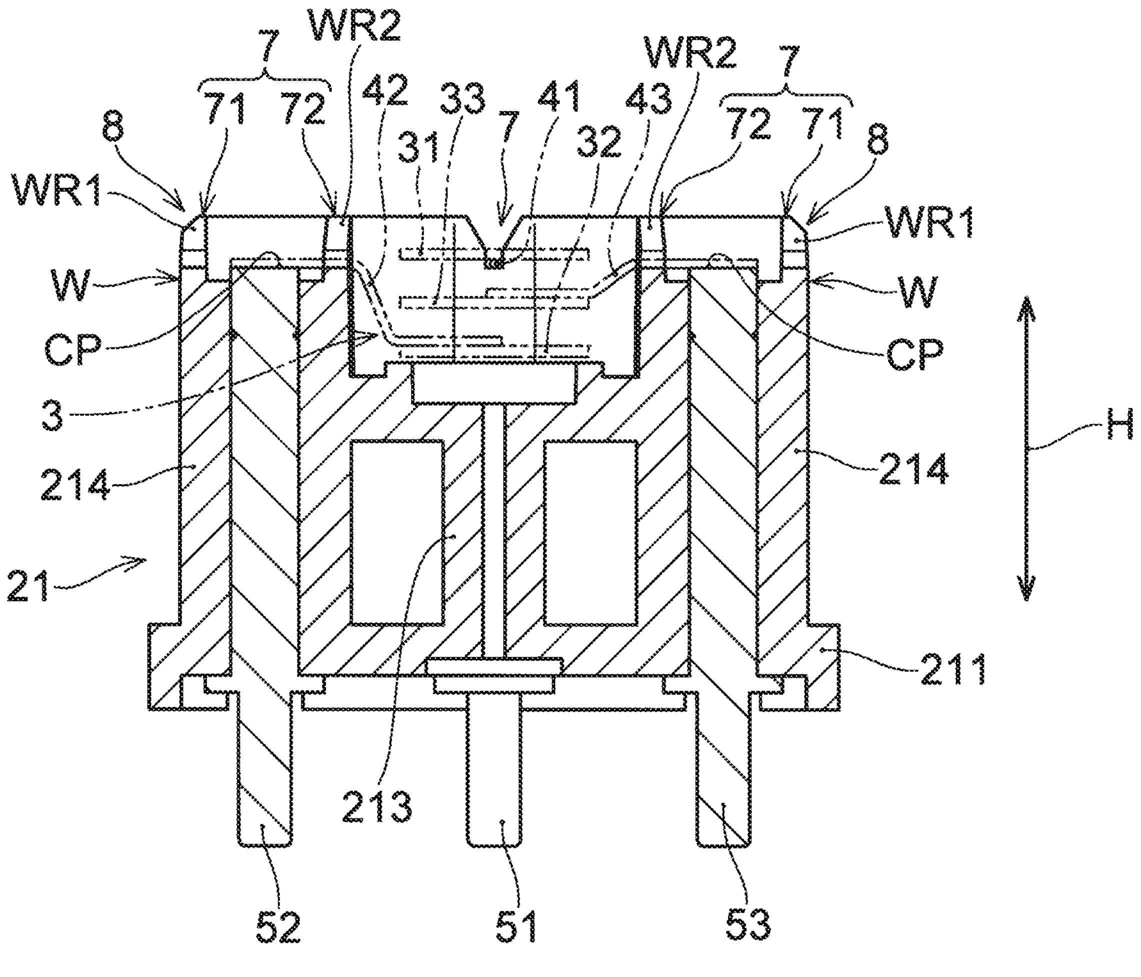
FIG. 5 is a cross-sectional view taken along a line V-V in FIG. 4.

As shown in FIG. 5, the external electrodes 51, 52, 53 are arranged so that the connection points CP of the external electrodes 51, 52, 53 to which the lead wires 41, 42, 43 are connected are located at a height corresponding to the electrode structure 3. As a result, when the electrodes 31, 32, 33 of the electrode structure 3 and the external electrodes 51, 52, 53 are connected with the lead wires 41, 42, 43, the lead wires 41, 42, 43 only need to be wired along substantially a horizontal direction and need not to be bent greatly, so that the lead wires 41, 42, 43 can be easily wired, and the gas sensor 1 can be easily manufactured. Moreover, since the lead wires 41, 42, 43 are not bent greatly, the lead wires 41, 42, 43 are suppressed from being applied with loads on bending parts thereof and being disconnected. Here, in the present specification, "a height corresponding . . . " refers to a position in the height direction H substantially same as that of a comparative object (for example, the electrode structure 3 or the electrodes 31, 32, 33) with respect to a reference position (for example, the surface of the base 211 or the surface of the electrode structure support 212) of the case body 21, but it also may include a position in the height direction H that is shifted by about a length of the comparison object in the height direction H. The description that "the connection points CP of the external electrodes 51, 52, 53 . . . are located at a height corresponding to the electrode structure 3" means that the connection point CP of at least any one of the external electrodes 51, 52, 53 is located at a height corresponding to a range of the electrode structure 3 in the height direction H. For example, the connection point CP of at least any one of the external electrodes 51, 52, 53 may be located at a height corresponding to any one of the electrodes 31, 32, 33 included in the electrode structure 3, the connection point CP of each of the external electrodes 51, 52, 53 may be located at a height corresponding to the electrodes 31, 32, 33 that correspond to the external electrodes 51, 52, 53, respectively.

In this embodiment, as shown in FIG. 5, the external electrodes 51, 52, 53 are arranged so that heights (positions in the height direction H) of the connection points CP of the external electrodes 51, 52, 53 substantially match with each other. As a result, it is not necessary to change arrangement heights of the lead wires 41, 42, 43 and to bend the lead wires 41, 42, 43, depending on the external electrodes 51, 52, 53, and therefore the lead wires 41, 42, 43 can be easily wired and the gas sensor 1 can be easily manufactured. In this embodiment, as shown in FIG. 5, the connection points CP of the external electrodes 51, 52, 53, which have heights that substantially match with each other, are located at a height corresponding to the reaction electrode 31 of the electrode structure 3. However, the heights of the connection points CP of the external electrodes 51, 52, 53 may be different from each other as long as at least one of the connection points CP is located at a height corresponding to the electrode structure 3.

The external electrodes 51, 52, 53 are each formed into a rod shape with metal such as, for example, platinum, gold, tungsten, and tantalum. Here, although three external electrodes 51, 52, 53 are provided in this embodiment, the gas sensor 1 only needs to comprise at least two electrodes, that is, the reaction electrode 31 and the counter electrode 32, as described above, and accordingly, the gas sensor 1 only needs to comprise at least two external electrodes, that is, the external electrode for reaction electrode 51 and the external electrode for counter electrode 52.

Here, in this embodiment, as shown in FIGS. 3 and 4, the case body 21 comprises a guide 7 that guides the lead wire 41, 42, 43 along an introduction path from the outside of the case body 21 toward the electrode structure 3 via the connection point CP of the external electrode 51, 52, 53. As a result, when the electrode 31, 32, 33 of the electrode structure 3 and the external electrode 51, 52, 53 are connected with the lead wire 41, 42, 43, the lead wire 41, 42, 43 can be easily wired between the connection point CP of the external electrode 51, 52, 53 and the electrode 31, 32, 33 of the electrode structure 3 from the outside of the case body 21, and therefore the gas sensor 1 can be easily manufactured. The guide 7 is arranged so that the above-described introduction path is located at a height corresponding to the connection point CP of the external electrode 51, 52, 53 and the electrode structure 3, which are located at corresponding heights to each other. As a result, when the lead wire 41, 42, 43 is introduced from the outside of the case body 21 and arranged between the electrode structure 3 and the connection point CP of the external electrode 51, 52, 53, the lead wire 41, 42, 43 can be introduced along substantially the horizontal direction, and positioning of the lead wire 41, 42, 43 in the height direction H can be easily performed. Here, the positions of the connection point CP and the electrode structure 3 in the description "an introduction path toward the electrode structure 3 via the connection point CP of the external electrode 51, 52, 53" have concepts that include not only positions of the connection point CP and the electrode structure 3 already arranged when the lead wire 41, 42, 43 is guided, but also virtual positions of the connection point CP and the electrode structure 3 arranged after the lead wire 41, 42, 43 is guided. The introduction path is, as shown by a reference sign "IP" in FIG. 8, a space defined by the guide 7 and extending from the outside of the case body 21 to the electrode structure 3 via the respective connection point CP. In this embodiment, the guide 7 is provided on the upper external electrode support 214*b* where the connection point CP of the external electrode 51, 52, 53 is located, as described above. However, the guide 7 only needs to be arranged so as to guide the lead wire 41, 42, 43 along the introduction path as described above and may be provided at a part of the case body 21 other than the upper external electrode support 214*b*.

A configuration of the guide 7 is not particularly limited as long as the guide 7 can guide the lead wire 41, 42, 43 along the introduction path from the outside of the case body 21 toward the electrode structure 3 via the connection point CP of the external electrode 51, 52, 53. In this embodiment, as shown in FIGS. 3 and 4, the guide 7 comprises a first guide 71 that guides the lead wire 41, 42, 43 from the outside of the case body 21 toward the connection point CP of the external electrode 51, 52, 53 and a second guide 72 that guides the lead wire 41, 42, 43 from the connection point CP of the external electrode 51, 52, 53 toward the electrode structure 3. As such, in the introduction path from the outside of the case body 21 toward the electrode structure 3, the first guide 71 and the second guide 72 are provided on both sides with the connection point CP of the external electrode 51, 52, 53 sandwiched therebetween, and therefore the lead wire 41, 42, 43 can be more accurately wired to the connection point CP of the external electrode 51, 52, 53. Moreover, in this embodiment, the first guide 71 and the second guide 72 are arranged substantially linearly along the introduction path from the outside of the case body 21 via the connection point CP of the external electrode 51, 52, 53 toward the electrode structure 3. As a result, when the lead wire 41, 42, 43 is arranged between the connection point CP of the external electrode 51, 52, 53 and the electrode structure 3, the lead wire 41, 42, 43 can be arranged to be maintained substantially linearly, and therefore the lead wire 41, 42, 43 can be arranged more easily. For example, when the lead wire 41, 42, 43 is introduced from the outside of the case body 21, the lead wire 41, 42, 43 may be introduced in a state where the lead wire 41, 42, 43 is cut to a predetermined length, that is, a length corresponding to a distance between each electrode 31, 32, 33 of the electrode structure 3 and each connection point CP of the external electrode 51, 52, 53, or may be introduced in a state where the lead wire 41, 42, 43 has a length longer than the predetermined length and may be cut after being connected to the connection point CP of the external electrode 51, 52, 53. In the latter case, for example, the lead wire 41, 42, 43 wound around a reel is guided in the order of the first guide 71 and the second guide 72, the lead wire 41, 42, 43 is fixed at the outside of the first guide 71 (outside of the case body 21) and at the outside of the second guide 72 (electrode structure 3 side) by a chuck, etc., with the tip of the lead wire 41, 42, 43 reaching the electrode structure 3, and the lead wire 41, 42, 43 is joined to the external electrode 51, 52, 53 at each connection point CP by welding, etc., and then, the lead wire 41, 42, 43 is cut at outside the first guide 71 or between the first guide 71 and each connection point CP, thereby, the lead wire 41, 42, 43 can be arranged at a predetermined position. By doing so, the wiring of the lead wire 41, 42, 43 can be automated while suppressing positional deviation of the lead wire 41, 42, 43.

In this embodiment, as shown in FIG. 5, the first guide 71 is positioned at a height corresponding to the connection point CP of the external electrode 51, 52, 53. More specifically, a bottom surface, which will be described below, of the first guide 71 is positioned at a height corresponding to the connection point CP of the external electrode 51, 52, 53. As a result, when the lead wire 41, 42, 43 is introduced from the outside of the case body 21 toward the connection point CP of the external electrode 51, 52, 53, the lead wire 41, 42, 43 can be positioned at the connection point CP of the external electrode 51, 52, 53 by introducing the lead wire 41, 42, 43 along substantially the horizontal direction. Here, in this embodiment, as described above, since the heights (positions in the height direction H) of the connection points CP of the external electrodes 51, 52, 53 substantially match with each other, the first guide 71 for each lead wire 41, 42, 43 is positioned at substantially the same height with each other. However, where the respective connection points CP of the external electrodes 51, 52, 53 are positioned at different heights, each first guide 71 may be positioned at a height corresponding to the connection point CP of each of the external electrodes 51, 52, 53 depending on heights of the connection points CP of the respective external electrodes 51, 52, 53, or may be inclined with respect to the horizontal direction from the outside of the case body 21 toward the connection point CP of each of the external electrodes 51, 52, 53.

Figure 6:
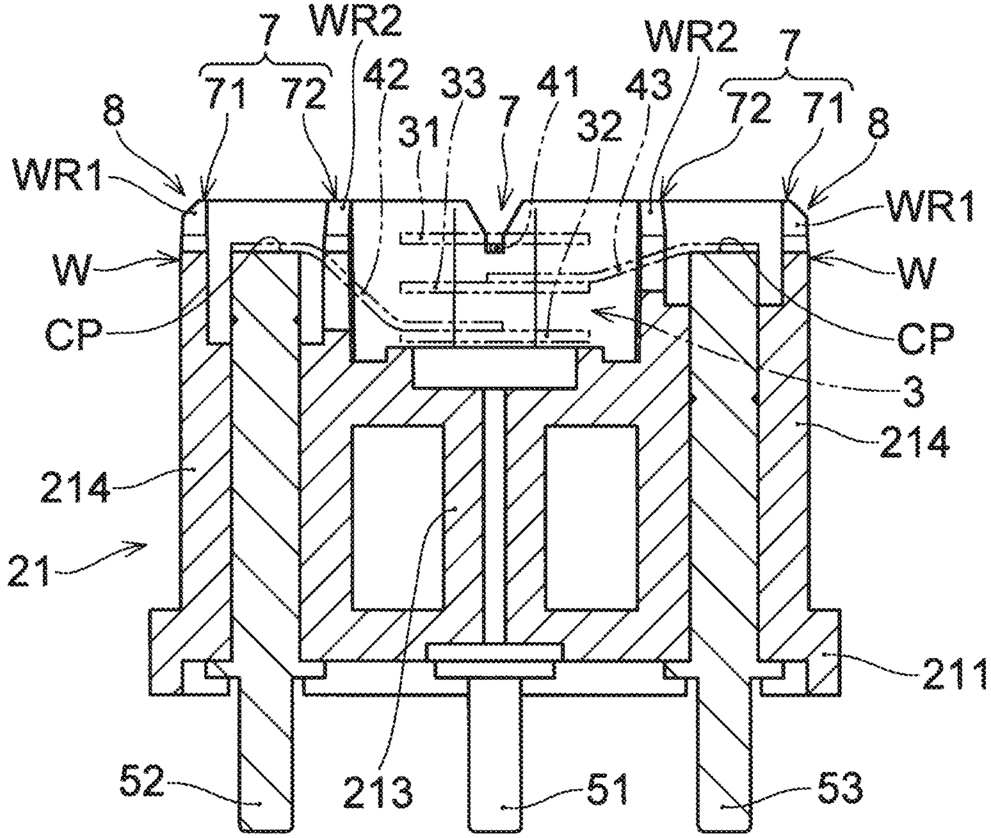
FIG. 6 is a cross-sectional view corresponding to FIG. 5 of a variation of the case body.
Figure 7:
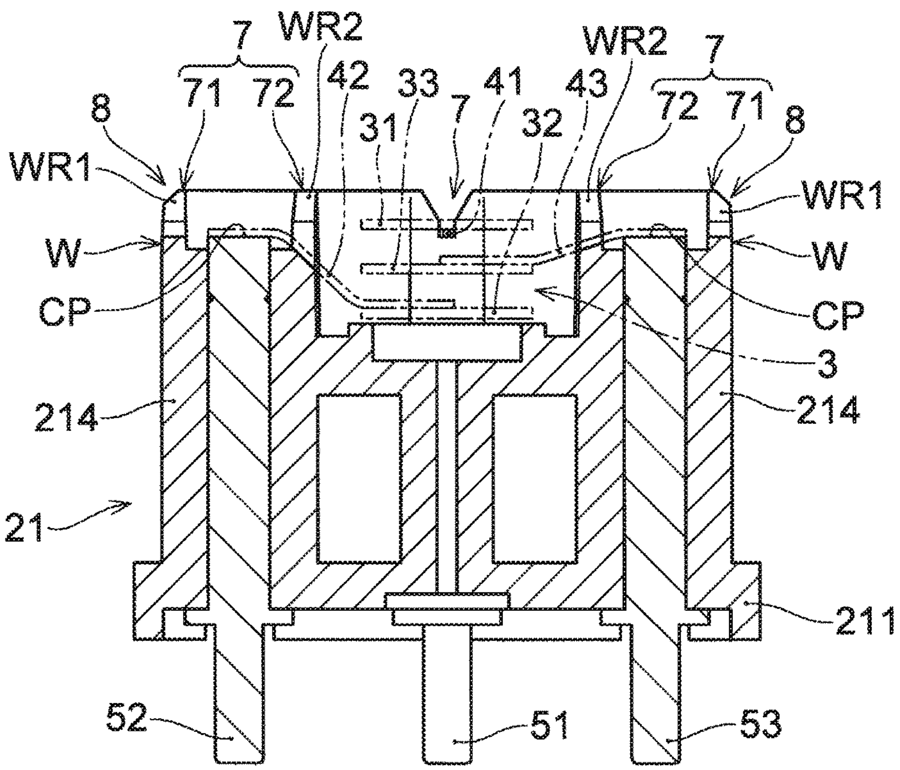
FIG. 7 is a cross-sectional view corresponding to FIG. 5 of another variation of the case body.

In this embodiment, as shown in FIG. 5, the second guide 72 is positioned at a height corresponding to the connection point CP of the external electrode 51, 52, 53 and the electrode structure 3. More specifically, a bottom surface, which will be described below, of the second guide 72 is positioned at a height corresponding to the connection point CP of the external electrode 51, 52, 53 and the electrode structure 3. As a result, when the lead wire 41, 42, 43 is introduced from the connection point CP of the external electrode 51, 52, 53 toward the electrode structure 3, the lead wire 41, 42, 43 can be positioned at the electrode structure 3 by introducing the lead wire 41, 42, 43 along substantially the horizontal direction. Here, in this embodiment, the electrodes 31, 32, 33 of the electrode structure 3 are mutually laminated along the height direction H, so that the electrodes 31, 32, 33 are located at different heights within the electrode structure 3 with each other. In this embodiment, as shown in FIG. 5, all of the second guides 72 for the electrodes 31, 32, 33 are positioned at a height corresponding to the reaction electrode 31 located at the highest position among the electrodes 31, 32, 33. As a result, when the lead wires 41, 42, 43 are wired for any of the electrodes 31, 32, 33, the lead wires 41, 42, 43 can be introduced along substantially the horizontal direction in the same way. However, for example, as shown in FIG. 6, the second guide 72 may be located at a height corresponding to each of the electrodes 31, 32, 33, depending on a position of each of the electrodes 31, 32, 33 in the height direction H. More specifically, the bottom surface of the second guide 72 may be located at a height corresponding to the surface of each of the electrodes 31, 32, 33, depending on a position of each of the electrodes 31, 32, 33 in the height direction H. As a result, a degree of curvature of the lead wires 41, 42, 43 caused by a difference in height between the connection point CP of each of the external electrodes 51, 52, 53 and each of the electrodes 31, 32, 33 is reduced, so that loads applied to the lead wires 41, 42, 43 can be reduced. Alternatively, for the same purpose, as shown in FIG. 7, the second guide 72 may be inclined corresponding to a difference in height between the connection point CP of each of the external electrodes 51, 52, 53 and each of the electrodes 31, 32, 33. More specifically, the bottom surface of the second guide 72 may be inclined corresponding to a difference in height between the connection point CP of each of the external electrodes 51, 52, 53 and each of the electrodes 31, 32, 33.

In this embodiment, as shown in FIGS. 3 and 4, the case body 21 comprises a wall part W formed around the connection point CP of the external electrode 51, 52, 53 in the horizontal direction. The first guide 71 is constituted by a peripheral wall of a first recess WR1 provided in the wall part W on the opposite side to the electrode structure 3 in the introduction path of the lead wire 41, 42, 43, and the second guide 72 is constituted by a peripheral wall of a second recess WR2 provided in the wall part W on the side of the electrode structure 3 in the introduction path of the lead wire 41, 42, 43. Each of the first recess WR1 and the second recess WR2 penetrates the wall part W along the introduction path of the lead wire 41, 42, 43, is formed of a bottom surface that delimits the lower end in the height direction H and side surfaces that delimit both sides in the horizontal direction perpendicular to the extending direction of the introduction path of the lead wire 41, 42, 43, and opens at the upper end in the height direction H. The bottom and side surfaces defining each of the first recess WR1 and the second recess WR2 constitute peripheral walls of the first recess WR1 and the second recess WR2 and function as guide surfaces onto which the lead wire 41, 42, 43 abut. In this embodiment, the bottom and side surfaces defining each of the first recess WR1 and the second recess WR2 are formed substantially parallel to the extending direction of the introduction path of the lead wire 41, 42, 43. A shape of each of the first recess WR1 and the second recess WR2 is not particularly limited as long as each of the first recess WR1 and the second recess WR2 is formed so that an interval between the side surfaces on both sides facing each of the first recess WR1 and the second recess WR2 becomes larger than the outer diameter of the lead wire 41, 42, 43. In the illustrated example, each of the first recess WR1 and the second recess WR2 is formed into substantially a funnel shape so that an interval between the side surfaces on both sides is constant on the lower side in the height direction H and become larger towards the opening of the upper end on the upper side in the height direction H. As a result, the lead wire 41, 42, 43 can be easily inserted into the first guide 71 and the second guide 72 even from the upper side in the height direction H of the case body 21, and the lead wire 41, 42, 43 can be easily arranged between the electrode structure 3 and the connecting point CP of the external electrode 51, 52, 53.

In this embodiment, as shown in FIGS. 3 and 4, the case body 21 has a holding structure 8 that can hold a predetermined amount of protective agent PA (see FIGS. 11 and 12) so as to cover the connection point CP of the external electrode 51, 52, 53, respectively, with respect to each of the external electrodes 51, 52, 53. By providing such a holding structure 8, the connection point CP can be protected by the protective agent PA, and corrosion of the connection point CP due to the electrolyte 6 can be suppressed. Moreover, since the holding structure 8 can hold a predetermined amount of protective agent PA, an amount of protective agent PA to be applied to the connection point CP can be easily managed, promoting automation of manufacturing of the gas sensor 1. Furthermore, the holding structure 8 is provided corresponding to the connection point CP of the external electrode 51, 52, 53 located at a height corresponding to the electrode structure 3, so that the holding structure 8 is located at a height corresponding to the electrode structure 3 and the connection point CP of the external electrode 51, 52, 53, or at a height in the vicinity of the top or bottom thereof. Therefore, after arranging the electrode 31, 32, 33 of the electrode structure 3 and arranging the lead wire 41, 42, 43 between the electrode 31, 32, 33 and the connection point CP of the external electrode 51, 52, 53, the protective agent PA can be applied to the connection point CP of the external electrode 51, 52, 53. As a result, unlike a conventional technology that requires an electrode arrangement and a lead wire wiring after applying a protective agent to a connection point of an external electrode, there is no need to wait for the protective agent to be dried or cured during manufacturing steps. Furthermore, unlike a conventional technology in which a connection point of an external electrode is located on a bottom of a case body, there is no need to insert an application device for applying a protective agent PA deep into the case body 21 below a position where the electrode structure 3 is provided, and the holding structure 8 can be easily accessed, so that the protective agent PA can be easily applied.

A structure of the holding structure 8 is not particularly limited as long as the holding structure 8 can hold a predetermined amount of protective agent PA so as to cover the connection point CP of the external electrode 51, 52, 53. In this embodiment, as shown in FIGS. 3 and 4, the holding structure 8 comprises a wall part W formed around the connection point CP of the external electrode 51, 52, 53 in the horizontal direction. The wall part W is provided around the entire circumference of the connection point CP in the horizontal direction and extend above the connection point CP in the height direction H. The holding structure 8 can hold a predetermined amount of protective agent PA by the wall part W formed around the connection point CP in the horizontal direction and protect the connection point CP with the predetermined amount of protective agent PA. In this embodiment, the holding structure 8 comprises the wall part W formed around the connection point CP and a bottom part B that closes a space surrounded by the wall part W at the lower end of the wall part W, and is formed into a bottomed cylindrical shape. In the surface of the bottom part B forming the holding structure 8, the external electrodes 51, 52, 53 protrude therefrom, respectively, and on the upper ends of the protruding external electrodes 51, 52, 53, the connection points CP connected to the lead wires 41, 42, 43 are formed, respectively.

In this embodiment, as shown in FIGS. 3 and 4, the holding structure 8 comprises a guide 7 that guides the lead wire 41, 42, 43 along the introduction path from the outside of the case body 21 toward the electrode structure 3 via the connection point CP of the external electrode 51, 52, 53. The fact that the holding structure 8 comprises the guide 7 allows, at substantially the same position, without requiring rearrangement of the lead wire 41, 42, 43: guidance of the lead wire 41, 42, 43 from the outside of the case body 21 to the electrode structure 3; arrangement of the lead wire 41, 42, 43 between the electrode structure 3 and the connection point CP of the external electrode 51, 52, 53; connection of the lead wire 41, 42, 43 to the connection point CP of the external electrode 51, 52, 53; and filling of the protective agent PA to the holding structure 8.

The protective agent, by covering the connection point CP of the external electrode 51, 52, 53, suppresses the electrolyte 6 from making a contact with the connection point CP and suppresses the connection point CP from corroding due to the electrolyte 6. The protective agent PA is not particularly limited as long as the protective agent PA can protect the connection point CP of the external electrode 51, 52, 53 from the electrolyte 6, but from the viewpoint of ease of filling into the holding structure 8, the protective agent PA is preferably a thermosetting resin that is in an uncured state before filling and can be cured after filling, and from the viewpoint of suppressing overflow from the holding structure 8, the protective agent PA is further preferably a thermosetting resin that has a predetermined viscosity or more in an uncured state, examples of which include, for example, an epoxy resin adhesive.

Next, a method for manufacturing the gas sensor 1 of this embodiment will be described with reference to the entire accompanying drawings, particularly FIGS. 8 to 12. However, the following description is merely an example, and the gas sensor of the present invention and the method for manufacturing the gas sensor are not limited to the following example. Moreover, although several steps will be described in turn below, those steps may be performed simultaneously or in different orders. Here, in FIGS. 8 to 12, illustrations of other components of the electrode structure 3 are omitted in order to make it easier to view arrangements of electrodes 31, 32, 33 of the electrode structure 3.

Figure 8:
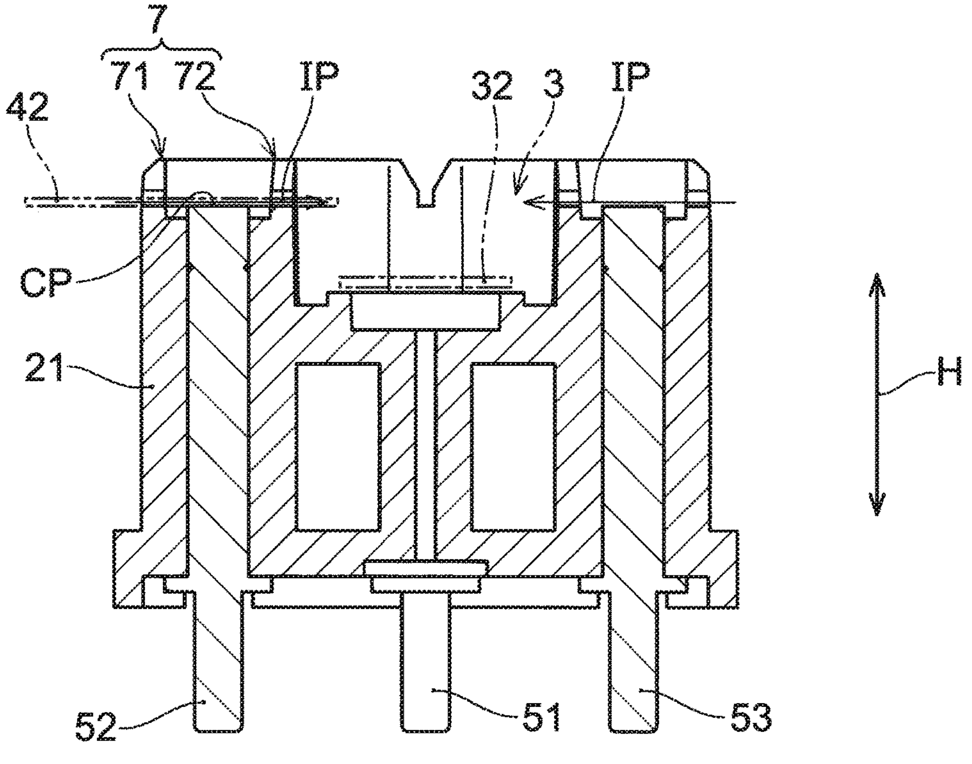
FIG. 8 is a diagram showing a state where a counter electrode is arranged and a lead wire for counter electrode is introduced in the case body shown in FIG. 5.

The method for manufacturing the gas sensor 1 of this embodiment comprises a step of providing a case body 21, as shown in FIG. 8. External electrodes 51, 52, 53 are fixed to the case body 21. In this embodiment, the case body 21 and the external electrodes 51, 52, 53 are integrally molded, and therefore a step of assembling separately formed case body 21 and external electrodes 51, 52, 53 can be omitted.

Moreover, an outflow-side buffer film OB and an outflow-side air-permeable sheet OS (see FIGS. 1 and 2) are laminated on the case body 21, and the outflow-side air-permeable sheet OS is fixed to the case body 21 by thermal fusion bonding.

The manufacturing method comprises, as a next step, a step of providing an electrode structure 3 on the case body 21, as shown in FIG. 8. In this step, first, a counter electrode 32 of the electrode structure 3 is provided on the case body 21. In this embodiment, the counter electrode 32 is laminated on the surface of the outflow-side air-permeable sheet OS. A reference electrode 33 and a reaction electrode 31 of the electrode structure 3 are laminated above the counter electrode 32 in parallel with or after the subsequent step. However, the electrodes 31, 32, 33 may be laminated in different orders.

As shown in FIG. 8, the manufacturing method comprises, as a next step, a step of introducing lead wire 41, 42, 43 along an introduction path from the outside of the case body 21 toward the electrode structure 3 via a connection point CP of the external electrode 51, 52, 53. In the example of FIG. 8, a lead wire for counter electrode 42 is introduced from the outside of the case body 21 toward the electrode structure 3 via a connection point CP of an external electrode for counter electrode 52. By introducing the lead wire for counter electrode 42 from the outside of the case body 21 toward the electrode structure 3 via the connection point CP, introduction of the lead wire for counter electrode 42 from the outside of the case body 21 and subsequent arrangement of the lead wire for counter electrode 42 between the electrode structure 3 and the connection point CP can be performed in a series of steps. In this embodiment, the connection point CP is located at a height corresponding to the electrode structure 3, and therefore the lead wire for counter electrode 42 can be introduced along substantially a horizontal direction and can be introduced easily by mechanical operation. Moreover, in this embodiment, a guide 7 for guiding the lead wire for counter electrode 42 is provided, and therefore the lead wire for counter electrode 42 can be wired easily and accurately. Here, instead of being introduced into the electrode structure 3 via the connection point CP along the introduction path as described above, the lead wire for counter electrode 42 may be introduced, for example, from the upper side of the case body 21 towards both the connection point CP and the electrode structure 3.

Figure 9:
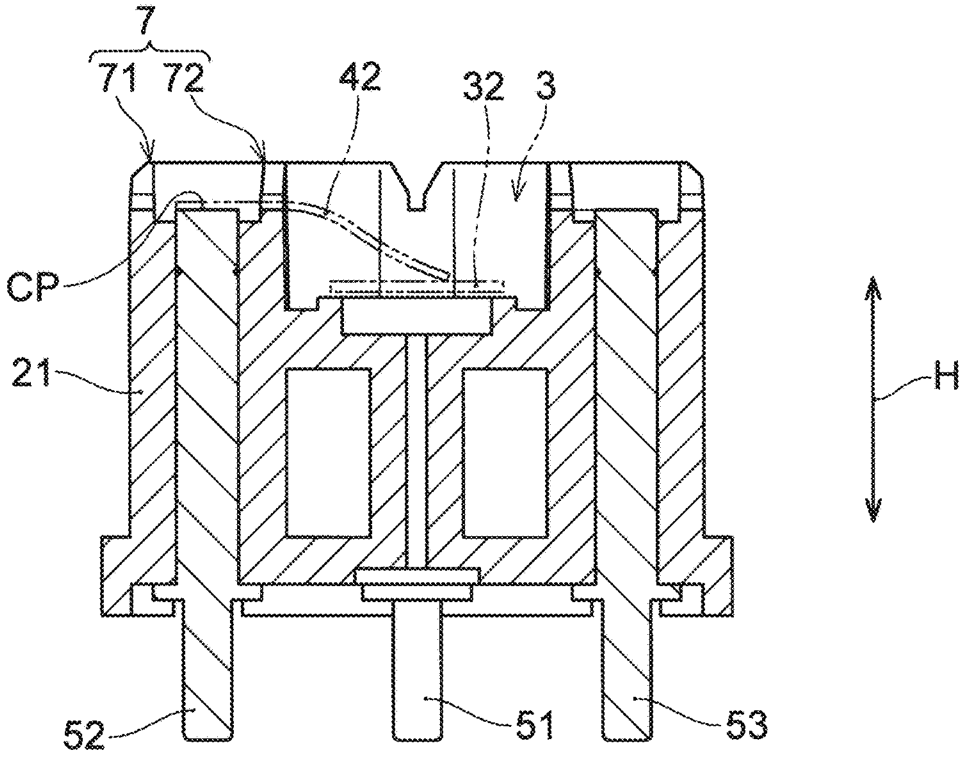
FIG. 9 is a diagram showing a state where a lead wire for counter electrode is arranged between the surface of the counter electrode and a connection point of an external electrode for counter electrode to connect the lead wire for counter electrode to the external electrode for counter electrode, after the state shown in FIG. 8.

As shown in FIG. 9, the manufacturing method comprises, as a next step, a step of arranging the lead wire 41, 42, 43 between the surface of the electrode 31, 32, 33 and the connection point CP of the external electrode 51, 52, 53. In the example of FIG. 9, the lead wire for counter electrode 42 is arranged between the surface of the counter electrode 32 and the connection point CP of the external electrode for counter electrode 52. Here, in this step, the lead wire for counter electrode 42 only needs to be located at least above the surface of the counter electrode 32 in the height direction H, and the lead wire for counter electrode 42 may be in contact with the surface of the counter electrode 32 as shown in FIG. 9 or may be slightly floating from the surface of the counter electrode 32. In this embodiment, this step is performed before the lead wire for counter electrode 42 is connected to the counter electrode 32 and the external electrode for counter electrode 52.

Figure 10:
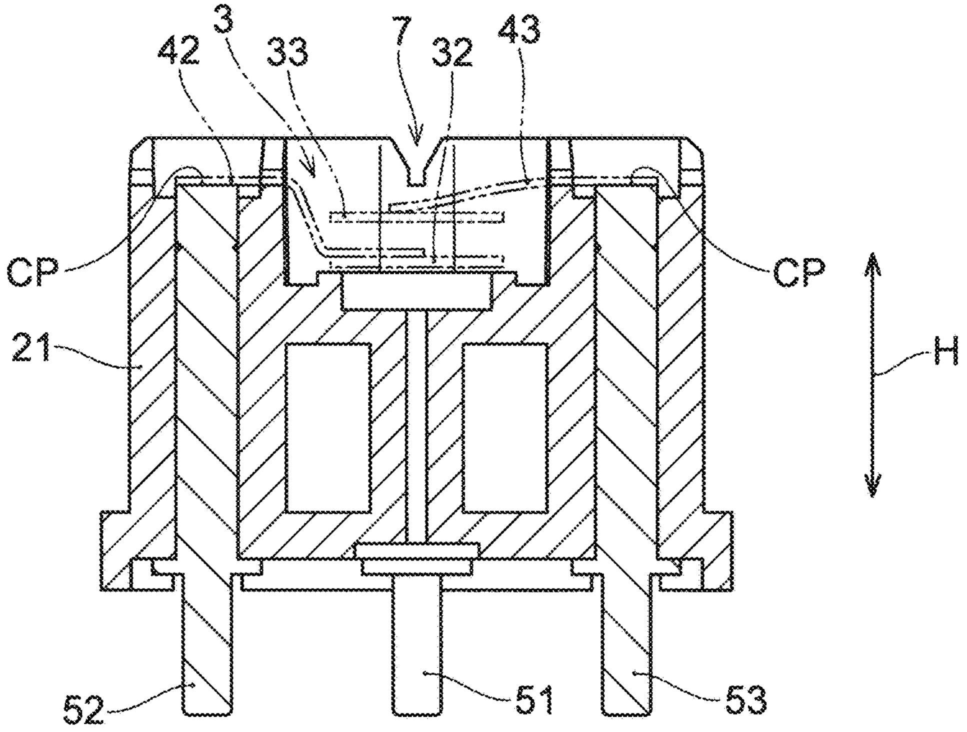
FIG. 10 is a diagram showing a state where a reference electrode and a lead wire for reference electrode are arranged after the state shown in FIG. 9.

As shown in FIG. 9, the manufacturing method comprises, as a next step, a step of connecting the lead wire 41, 42, 43 to the external electrode 51, 52, 53 at the connection point CP of the external electrode 51, 52, 53, with the lead wire 41, 42, 43 being arranged on the surface of the electrode 31, 32, 33. Here, where a lead wire of a predetermined length or more, like a lead wire wound around a reel, is used as the lead wire 41, 42, 43, the manufacturing method may comprise, after the step of connecting the lead wire 41, 42, 43 to the external electrode 51, 52, 53, a step of cutting the lead wire 41, 42, 43 at predetermined positions (for example, outside the first guide 71, between the first guide 71 and the connection point CP, etc.), with the lead wire 41, 42, 43 being connected to the external electrode 51, 52, 53 and the lead wire 41, 42, 43 being arranged on the surface of the electrode 31, 32, 33. In the example of FIG. 9, the lead wire for counter electrode 42 is connected to the external electrode for counter electrode 52 at the connection point CP of the external electrode for counter electrode 52 while being arranged on the surface of the counter electrode 32. The connection between the lead wire for counter electrode 42 and the external electrode for counter electrode 52 is performed by welding or the like. In the conventional technology, it is necessary to wire a lead wire while being bent so that one end of the lead wire is connected to an external electrode and then the other end thereof is arranged on an electrode, which makes it difficult for wiring of the lead wire. However, in this embodiment, since the lead wire for counter electrode 42 is connected to the external electrode for counter electrode 52 while being arranged on the surface of the counter electrode 32, such complicated wiring is not necessary. Here, also in this step, the lead wire for counter electrode 42 only needs to be located at least above the surface of the counter electrode 32 in the height direction H, and the lead wire for counter electrode 42 may be in contact with the surface of the counter electrode 32 as shown in FIG. 9 or may be slightly floating from the surface of the counter electrode 32. As shown in FIG. 10, in the subsequent step, by laminating other components above the counter electrode 32 and closing the case body 21 with the case cover 22 (see FIGS. 1 and 2), the lead wire for counter electrode 42 is pressed onto the surface of the counter electrode 32 and is connected to the surface of the counter electrode 32 so as to extend along the surface of the counter electrode 32.

Next, in this embodiment, after an electrolyte-holding member for counter electrode 35, an electrolyte-holding member for electrolyte supply 37, and a support sheet 39 (see FIGS. 1 and 2) are laminated above the counter electrode 32 in this order, a reference electrode 33 is laminated as shown in FIG. 10. Then, the lead wire for reference electrode 43 is introduced along the introduction path from the outside of the case body 21 toward the electrode structure 3 via the connection point CP of the external electrode for reference electrode 53 (see FIGS. 3 and 4) in the same manner as for the lead wire for counter electrode 42. The lead wire for reference electrode 43 is arranged between the surface of the reference electrode 33 and the connection point CP of the external electrode for reference electrode 53, and then connected to the external electrode for reference electrode 53 at the connection point CP of the external electrode for reference electrode 53 while being arranged on the surface of the reference electrode 33. The method of connecting the lead wire for reference electrode 43 to the external electrode for reference electrode 53 and the reference electrode 33 is performed in the same manner as for the lead wire for counter electrode 42.

Figure 11:
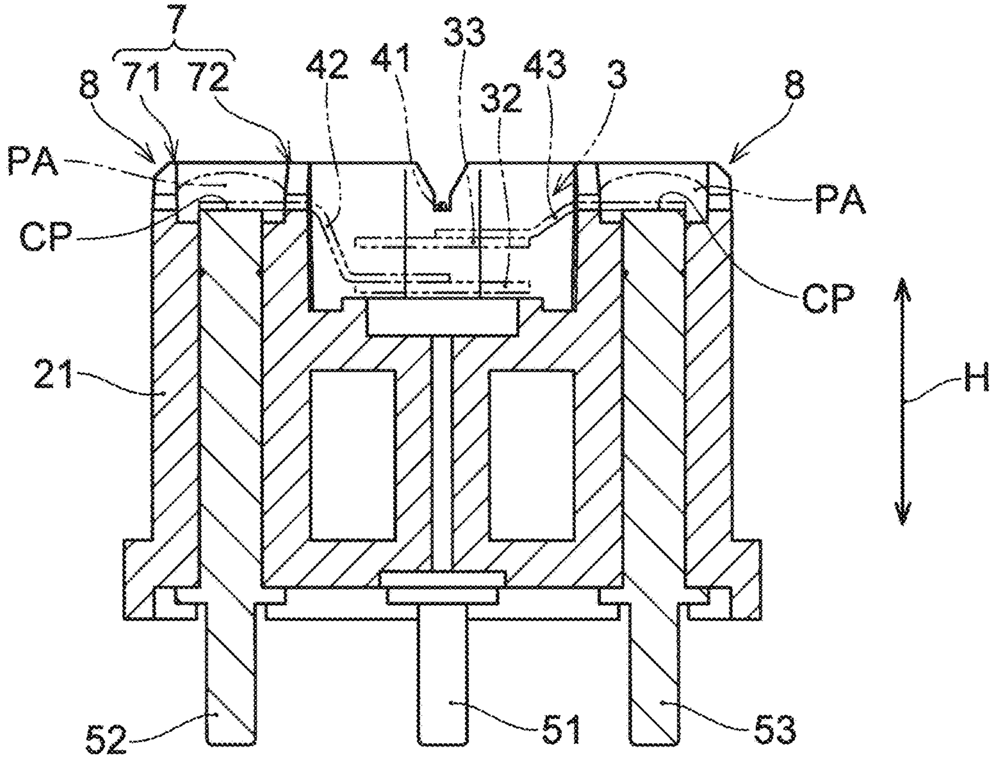
FIG. 11 is a diagram showing a state where a lead wire for reaction electrode is introduced, the lead wire for reaction electrode is connected to an external electrode for reaction electrode, and a holding structure is filled with a protective agent, after the state shown in FIG. 10.

Next, in this embodiment, an electrolyte-holding member for reference electrode 36, a support sheet 38, and an electrolyte-holding member for reaction electrode 34 are laminated above the reference electrode 33 in this order (see FIGS. 1 and 2). Then, as shown in FIG. 11, the lead wire for reaction electrode 41 is introduced along the introduction path from the outside of the case body 21 toward the electrode structure 3 via the connection point CP of the external electrode for reaction electrode 51 in the same manner as for the lead wire for counter electrode 42 and the lead wire for reference electrode 43. The lead wire for reaction electrode 41 is arranged between a virtual surface of the reaction electrode 31 (see FIG. 12), which will be arranged later, and the connection point CP of the external electrode for reaction electrode 51, and then connected to the external electrode for reaction electrode 51 at the connection point CP of the external electrode for reaction electrode 51 while being arranged on the virtual surface of the reaction electrode 31, which will be arranged later. In this embodiment, the lead wire for reaction electrode 41 is arranged on the virtual surface of the reaction electrode 31, which will be arranged after the lead wire for reaction electrode 41 is arranged, but after the reaction electrode 31 is arranged, the lead wire for reaction electrode 41 may be arranged on the surface of the reaction electrode 31, which is actually arranged. Connection of the lead wire for reaction electrode 41 to the external electrode for reaction electrode 51 is performed in the same manner as for the lead wire for counter electrode 42 and the lead wire for reference electrode 43.

As shown in FIG. 11, the manufacturing method may comprise, as a next step, a step of supplying a predetermined amount of protective agent PA to the holding structure 8 so as to cover the connection point CP of the external electrode 51, 52, 53 with the protective agent PA. The connection point CP of the external electrode 51, 52, 53 is suppressed from corroding due to the electrolyte 6 by being covered with the protective agent PA. Since the holding structure 8 is configured to hold a predetermined amount of protective agent PA, it becomes easy to manage the amount of protective agent PA when supplying the protective agent PA.

Figure 12:
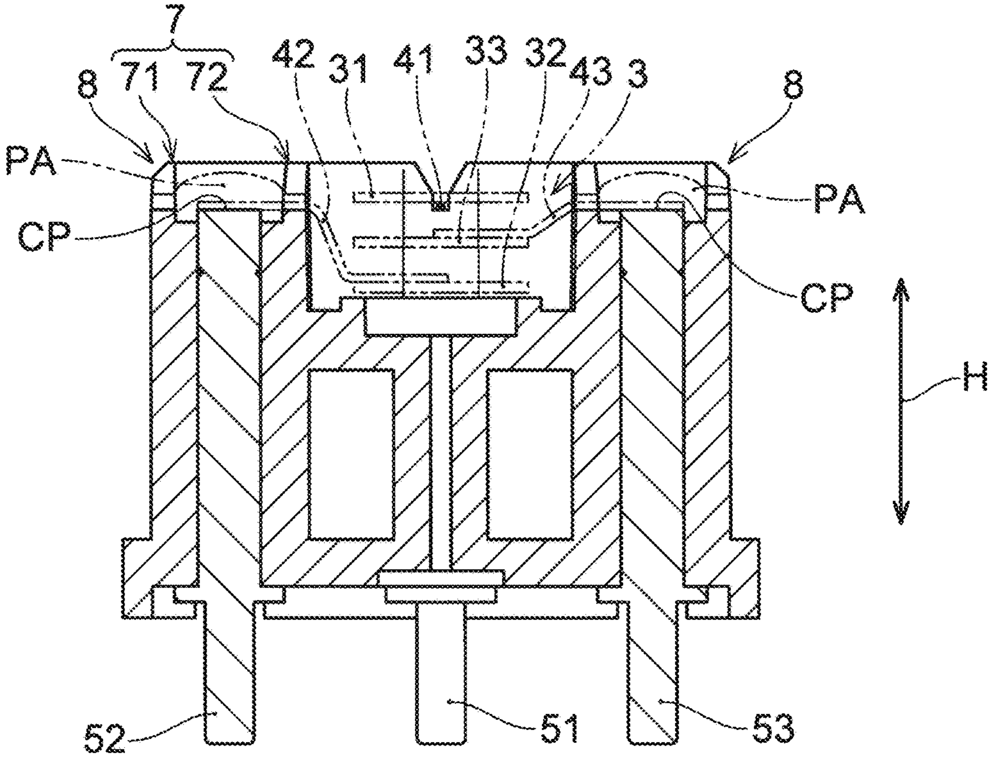
FIG. 12 is a diagram showing a state where a reaction electrode is arranged after the state shown in FIG. 11.

Next, as shown in FIG. 12, the reaction electrode 31 is laminated on the electrolyte-holding member for reaction electrode 34 (see FIGS. 1 and 2) and the lead wire for reaction electrode 41, so that the lead wire for reaction electrode 41 is connected to the surface of the reaction electrode 31 so as to extend along the surface of the reaction electrode 31. In this embodiment, the reaction electrode 31 is fixed to the case cover 22 through the air-permeable sheet 31*b* by fixing the air-permeable sheet 31*b* to the case cover 22. Therefore, by closing the case body 21 with the case cover 22, the reaction electrode 31 is laminated on the electrolyte-holding member for reaction electrode 34 and the lead wire for reaction electrode 41.

The case cover 22 is fixed to the case body 21 by a known adhesive means such as ultrasonic welding and an adhesive. Finally, the electrolyte 6 (see FIG. 2) is supplied to an electrolyte-accommodating space CS in the case 2, which is formed by fixing the case cover 22 to the case body 21.

Next, gas sensors 1 of second and third embodiments, which are variations of the gas sensor 1 of the first embodiment described above, will be described with FIGS. 13 to 16. The gas sensors 1 of the second and third embodiments differ from the gas sensor 1 of the first embodiment mainly in that the electrode of the electrode structure 3 comprises at least two reaction electrodes for detecting different gases to be detected, and accordingly, the lead wire 4 and the external electrode 5 comprise at least two lead wires for reaction electrode and at least two external electrodes for reaction electrode, respectively. The differences will be mainly described below, omitting descriptions of matters common with the gas sensor 1 of the first embodiment described above. Moreover, components having the same functions as the components of the gas sensor 1 of the first embodiment will be described using the same reference numerals. All of the matters described regarding the gas sensor 1 of the first embodiment can be applied to the gas sensors 1 of the second and third embodiments as long as the purpose of the invention can be achieved. Furthermore, effects obtained by configurations described above for the gas sensor 1 of the first embodiment can also be obtained in the gas sensors 1 of the second and third embodiments as long as the gas sensors 1 of the second and third embodiments have the configurations.

Second Embodiment

Figure 13:
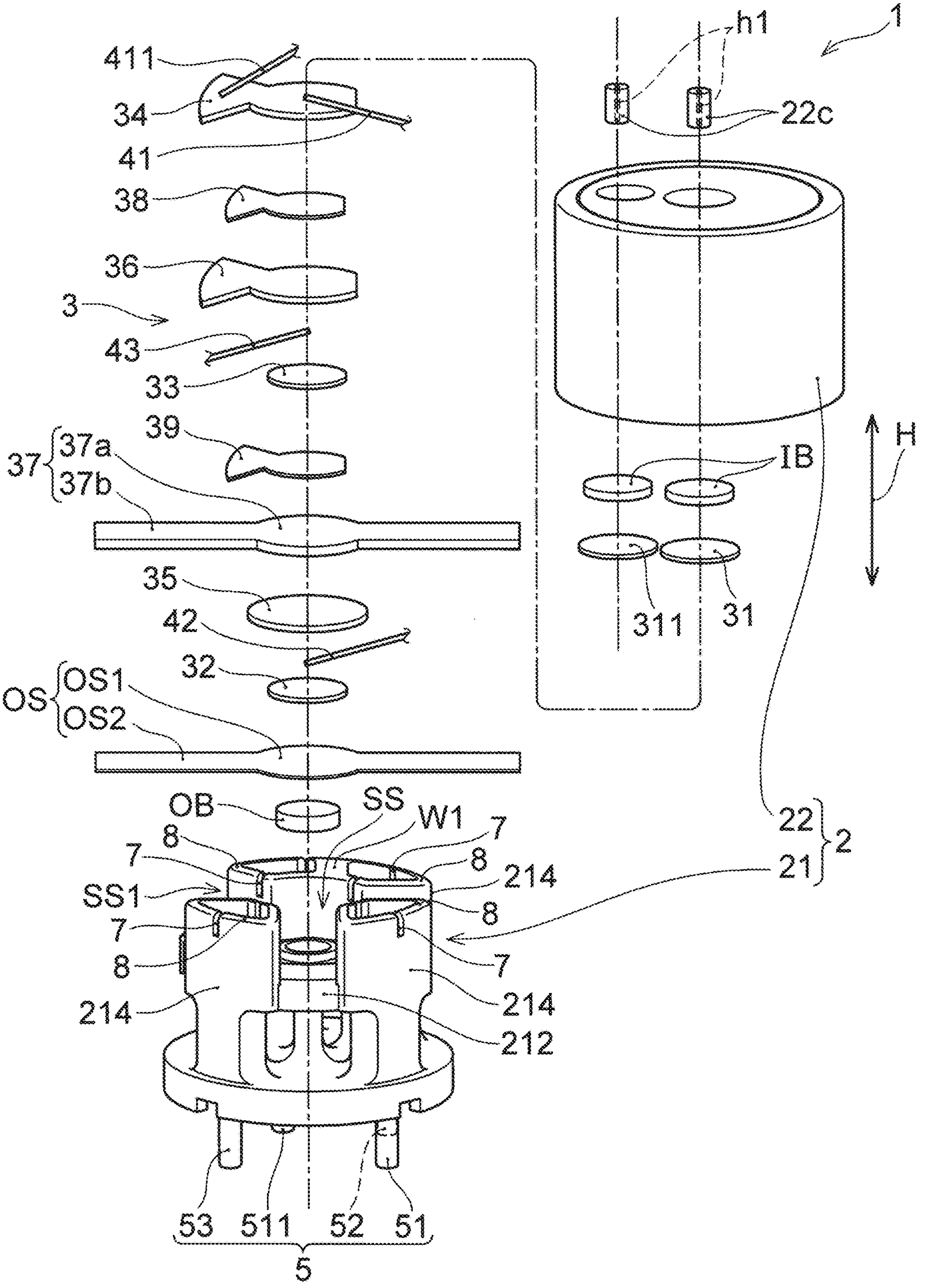
FIG. 13 is an exploded perspective view of a constant potential electrolytic gas sensor according to a second embodiment of the present invention.
Figure 14:
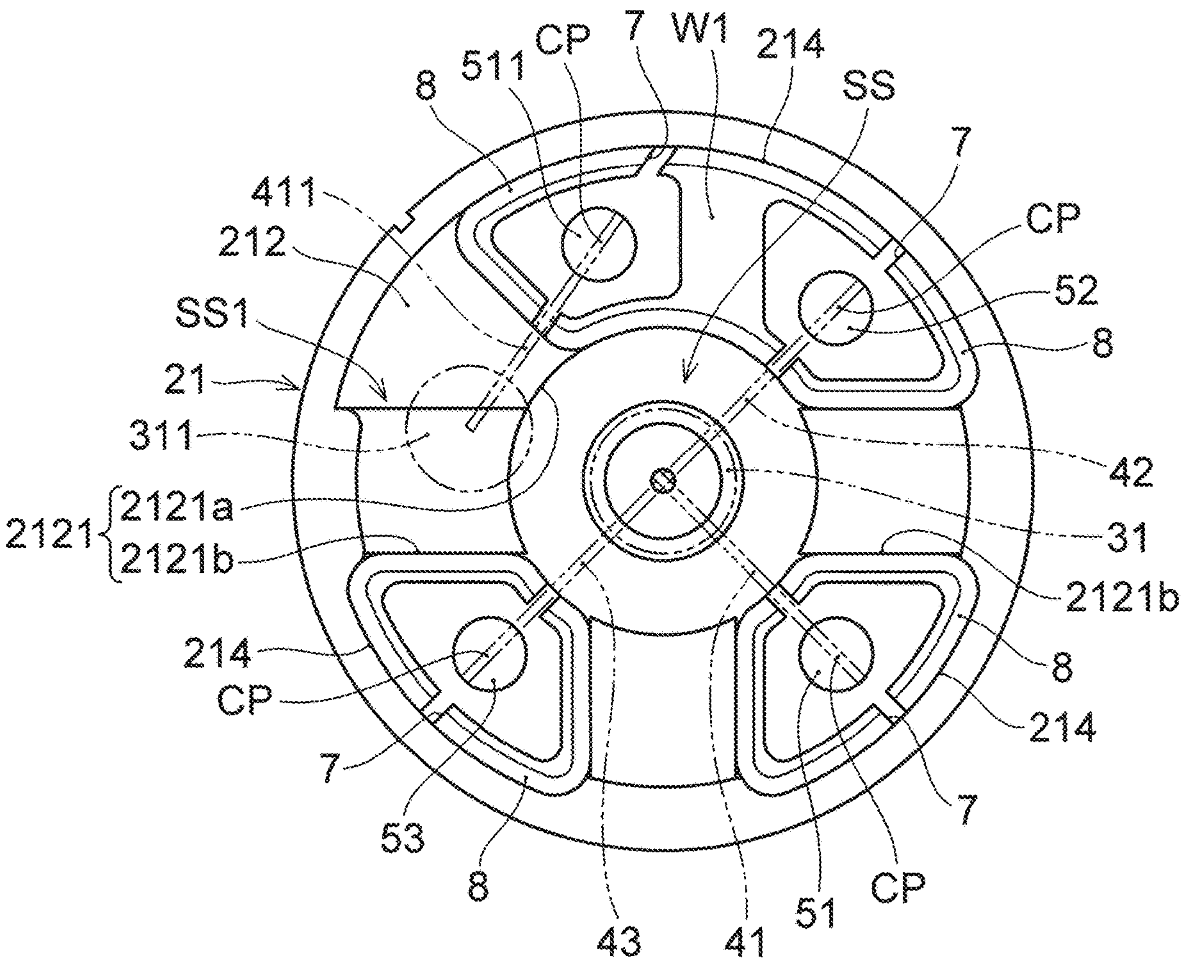
FIG. 14 is a top view of a case body of the constant potential electrolytic gas sensor in FIG. 13.

In the gas sensor 1 of the second embodiment, as shown in FIGS. 13 and 14, the electrode of the electrode structure 3 comprises two reaction electrodes 31, 311 for detecting different gases to be detected, one counter electrode 32, and one reference electrode 33. In this embodiment, one counter electrode 32 and one reference electrode 33 are used in common for the two reaction electrodes 31, 311. However, the electrode of the electrode structure 3 may comprise two counter electrodes corresponding to the two reaction electrodes 31, 311, respectively. In that case, the two counter electrodes 32 can be formed by, for example, film-making two electrode materials (for example, in substantially a semicircular shape) on one air-permeable sheet (for example, in substantially a circular shape) at a slit-like interval from each other, or can be formed to be separate and distinct from each other. In this way, where the electrode of the electrode structure 3 comprises a total of five electrodes of two reaction electrodes, two counter electrodes, and one reference electrode, a sensor 1 can also be formed using a case 2 in the third embodiment, which will be described below, similarly comprising a total of five electrodes. The gas sensor 1 can detect a first gas to be detected, such as, for example, an oxygen gas, with one reaction electrode 31 of two reaction electrodes 31, 311 (hereinafter also referred to as a "first reaction electrode 31") and detect a second gas to be detected, such as, for example, a hydrogen sulfide gas or a carbon monoxide gas, with the other reaction electrode 311 of the two reaction electrodes 31, 311 (hereinafter also referred to as a "second reaction electrode 311"). Here, in this embodiment, the electrode structure 3 comprises two reaction electrodes 31, 311, but the electrode structure 3 only need to comprise at least two reaction electrodes for the purpose of detecting the different gases to be detected, and may comprise three reaction electrodes as in the case of the gas sensor 1 of the third embodiment shown below, or may comprise more than three reaction electrodes. Where the electrode structure 3 comprises at least two reaction electrodes, the electrode structure 3 may comprise at least two counter electrodes corresponding to the at least two reaction electrodes, respectively.

As shown in FIG. 13, the first reaction electrode 31 and the second reaction electrode 311 are arranged so as not to overlap with each other when viewed in the height direction H. More specifically, the first reaction electrode 31 is laminated with the counter electrode 32 and the reference electrode 33 in the height direction H, and the second reaction electrode 311 is arranged at a position spaced apart from the first reaction electrode 31, the counter electrode 32, and the reference electrode 33 in a direction (horizontal direction) perpendicular to the height direction H. As a result, a gas can be supplied independently from the outside to each of the reaction electrodes 31, 311. Here, where the electrode structure comprises three or more reaction electrodes, the three or more reaction electrodes are arranged at positions spaced apart from each other in a direction (horizontal direction) perpendicular to the height direction H. Although the positions of the two reaction electrodes 31, 311 relative to each other in the height direction H are not particularly limited, in this embodiment, the second reaction electrode 311 is arranged at a height corresponding to the first reaction electrode 31 by fixing the first and second reaction electrodes 31, 311 on the upper wall of the case cover 22. Here, where the electrode structure comprises three or more reaction electrodes, the three or more reaction electrodes are arranged at heights corresponding to each other. In this embodiment, the first reaction electrode 31 and the second reaction electrode 311 have the same configuration as the reaction electrode 31 described in connection with the gas sensor 1 of the first embodiment, and have the same configuration with each other, but may have a different configuration from the reaction electrode 31 in the first embodiment or may have a different configuration from each other.

In the electrode structure 3 comprising the two reaction electrodes 31, 311, the electrolyte-holding member for reaction electrode 34 laminated on the two reaction electrodes 31, 311 is formed into a shape and a size that make a contact with both surfaces of the two reaction electrodes 31, 311, as shown in FIG. 13. Thereby, the electrolyte 6 can be supplied to both of the two reaction electrodes 31, 311 with one electrolyte-holding member for reaction electrode 34. In this embodiment, the electrolyte-holding member for reaction electrode 34 is formed into a sheet shape with a shape and a size that fit a first electrode structure-supporting space SS and a second electrode structure-supporting space SS1 of the case body 21, which will be described below. Similarly, the electrolyte-holding member for reference electrode 36 is also formed into a sheet shape with substantially the same shape and size as the electrolyte-holding member for reaction electrode 34. In this embodiment, the electrolyte-holding member for counter electrode 35 is formed into substantially a circular sheet shape that fits the first electrode structure-supporting space SS, but may be formed into a sheet shape with substantially the same shape and size as the electrolyte-holding member for reaction electrode 34. Moreover, the support sheets 38, 39, which are optionally laminated within the electrode structure 3, have substantially the same shape as the electrolyte-holding member for reaction electrode 34 and the electrolyte-holding member for reference electrode 36, and the support sheets 38, 39 are formed into sizes smaller than those of the electrolyte-holding member for reaction electrode 34 and the electrolyte-holding member for reference electrode 36 so as not to hinder contacts between the electrolyte-holding members.

As shown in FIG. 13, the electrolyte-holding member for electrolyte supply 37, which is laminated within the electrode structure 3, comprises a sheet-like main body 37*a*, and two sheet-like extension parts 37*b*, 37*b* that protrude on substantially the same straight line in substantially opposite directions to each other in an out-of-plane direction from the main body 37*a*. The main body 37*a* is formed so as to fit into the first electrode structure-supporting space SS on the electrode structure support 212, which will be described below, and also to fit into a main body groove part 2121*a* (see FIG. 14) of the electrode structure support 212, which will be described below. The main body 37*a* is laminated with the first reaction electrode 31, the counter electrode 32, and the reference electrode 33 (as well as each electrolyte-holding member for electrode) in the first electrode structure-supporting space SS. Moreover, each of the two extension parts 37*b*, 37*b* is formed so as to fit into an extension groove part 2121*b* (see FIG. 14) of the electrode structure support 212, which will be described below. The two extension parts 37*b*. 37*b* extend in opposite directions to each other with respect to the electrode structure support 212 of the case body 21 and are bent at the outer edge of the electrode structure support 212 to be arranged at opposing positions in the electrolyte-accommodating space CS (also see FIG. 2). A part of one of the two extension parts 37*b*, 37*b* is partially laminated with the second reaction electrode 311 (as well as the electrolyte-holding member for reaction electrode 34 and the electrolyte-holding member for reference electrode 36) in a second electrode structure-supporting space SS1.

The gas sensor 1 of this embodiment comprises two reaction electrodes 31, 311, and accordingly as shown in FIGS. 13 and 14, comprises two lead wires for reaction electrode 41, 411 connected to the two reaction electrodes 31, 311, respectively, and two external electrodes for reaction electrode 51, 511 connected to the two lead wires for reaction electrodes 41, 411, respectively. That is, in the gas sensor 1 of this embodiment, the lead wire 4 includes two lead wires for reaction electrodes 41, 411, a lead wire for counter electrode 42 connected to the counter electrode 32, and a lead wire for reference electrode 43 connected to the reference electrode 33. Moreover, the external electrode 5 includes two external electrodes for reaction electrode 51, 511, an external electrode for counter electrode 52 connected to the lead wire for counter electrode 42, and an external electrode for reference electrode 53 connected to the lead wire for reference electrode 43. The two external electrodes for reaction electrode 51, 511 are arranged so that connection points CP, CP of the two external electrodes for reaction electrodes 51, 511 are located at heights corresponding to the two reaction electrodes 31, 311. As a result, when connecting the two reaction electrodes 31, 311 and the two external electrodes for reaction electrodes 51, 511 with the two lead wires for reaction electrodes 41, 411, both the two lead wires for reaction electrodes 41, 411 can be wired along substantially a horizontal direction and do not need to be bent greatly, and therefore the two lead wires for reaction electrodes 41, 411 can be easily wired, and the gas sensor 1 can be easily manufactured. Here, where the electrode structure comprises three or more reaction electrodes, three or more lead wires for reaction electrode and three or more external electrodes for reaction electrode are provided corresponding to the three or more reaction electrodes, respectively. In that case, the three or more external electrodes for reaction electrode are arranged so that connection points of the three or more external electrodes for reaction electrode are located at heights corresponding to the three or more reaction electrodes. However, regardless of the descriptions above, the external electrode for reaction electrode may be arranged so that the connection point of the external electrode for reaction electrode is located at a different height from the reaction electrode.

In the gas sensor 1 of this embodiment, the case 2 has a configuration different from that of the case 2 of the gas sensor 1 of the first embodiment in order to additionally accommodate the second reaction electrode 311, the second lead wire for reaction electrode 411, and the second external electrode for reaction electrode 511, with respect to the gas sensor 1 of the first embodiment. As shown in FIGS. 13 and 14, the case body 21 of the case 2 in this embodiment comprises two external electrode supports 214, 214 each for supporting one external electrode (in this embodiment, each of a first external electrode for reaction electrode 51 and an external electrode for reference electrode 53) and one external electrode support 214 for supporting two external electrodes (in this embodiment, a second external electrode for reaction electrode 511 and an external electrode for counter electrode 52). Each of the external electrode supports 214, 214 for supporting one external electrode 51, 53 is provided with one guide 7 and one holding structure 8, and the external electrode support 214 for supporting two external electrodes 511, 52 is provided with two guides 7, 7 and two holding structures 8, 8. Between the two holding structures 8, 8, a partition wall W1 is provided, which restricts an amount of protective agent PA used for each of the connection points CP of the external electrodes 511, 52 to a predetermined amount. The guide 7 may have a structure similar to the guide 7 of the gas sensor 1 of the first embodiment, regardless of the illustrated example. Here, the number, the shape, the arrangement, etc. of the external electrode support, the guide, and the holding structure can be modified as appropriate depending on the number, the shape, the arrangement, etc. of the reaction electrode, the counter electrode, the reference electrode, and the external electrode.

In this embodiment, as shown in FIGS. 13 and 14, in the case body 21, a first electrode structure-supporting space SS surrounded by three external electrode supports 214 in the vicinity of the center of the electrode structure support 212 in the horizontal direction and a second electrode structure-supporting space SS1 between the two external electrode supports 214, 214 adjacent to each other along the peripheral edge of the first electrode structure-supporting space SS are formed on the surface of the electrode structure support 212. In the first electrode structure-supporting space SS, the first reaction electrode 31, the counter electrode 32, and the reference electrode 33 (as well as each electrolyte-holding member for electrode) are supported, and in the second electrode structure-supporting space SS1, the second reaction electrode 311 (as well as the electrolyte-holding member for reaction electrode 34 and the electrolyte-holding member for reference electrode 36) are supported. Here, in this embodiment, the first electrode structure-supporting space SS is formed so as to have the same shape and size as the electrode structure-supporting space SS described in connection with the gas sensor 1 of the first embodiment, but the first electrode structure-supporting space SS may be formed into a shape and a size different from the electrode structure-supporting space SS in the first embodiment.

As shown in FIG. 14, in the electrode structure support 212 of the case body 21, a groove part 2121 is formed in which the outflow-side air-permeable sheet OS and the electrolyte-holding member for electrolyte supply 37 are arranged. The groove part 2121 is formed into a shape and a size into which the outflow-side air-permeable sheet OS and the electrolyte-holding member for electrolyte supply 37 can be inserted. The groove part 2121 comprises a main body groove part 2121*a* into which the main body OS1 of the outflow-side air-permeable sheet OS and the main body 37*a* of the electrolyte-holding member for electrolyte supply 37 can be inserted, and two extension groove parts 2121*b*, 2121*b* into which the extension part OS2 of the outflow-side air-permeable sheet OS and the extension part 37*b* of the electrolyte-holding member for electrolyte supply 37 can be inserted. The main body groove part 2121*a* is provided below the first electrode structure-supporting space SS, and one of the two extension groove parts 2121*b*, 2121*b* is provided on a part below the second electrode structure-supporting space SS1. The second reaction electrode 311 supported in the second electrode structure-supporting space SS1 is arranged so as to straddle the terminal edge of the extension groove part 2121*b* in a direction perpendicular to an extending direction of the extension groove part 2121*b*.

As shown in FIG. 13, the outflow-side air-permeable sheet OS arranged in the groove part 2121 of the electrode structure support 212 comprises a sheet-like main body OS1, and two sheet-like extension parts OS2, OS2 that protrude on substantially the same straight line in substantially opposite directions to each other in an out-of-plane direction from the main body OS1. The two extension parts OS2, OS2 extend along the extension groove part 2121*b* of the groove part 2121 in opposite directions to each other with respect to the electrode structure support 212 of the case body 21 and are bent at the outer edge of the electrode structure support 212 to be arranged at opposing positions in the electrolyte-accommodating space CS (also see FIG. 2). For example, if the gas sensor 1 is inclined toward one of the two extension parts OS2, OS2, the entirety of the one extension part OS2 in the electrolyte-accommodating space CS is immersed into the electrolyte 6, which makes it difficult for a gas in the electrolyte-accommodating space CS to be discharged to the outside of the case 2 through the one extension part OS2. However, even if so, the other of the two extension parts OS2, OS2 is not at least partially immersed into the electrolyte 6 (in the vicinity of the boundary between the electrode structure support 212 and the electrolyte-accommodating space CS), so that a gas in the electrolyte-accommodating space CS can be discharged to the outside of the case 2 through the other extension part OS2. In the gas sensor 1 of this embodiment, by providing the outflow-side air-permeable sheet OS that comprises the two extension parts OS2, OS2 extending in substantially the same straight line in opposite directions to each other, a gas in the electrolyte-accommodating space CS can be discharged to the outside of the case 2 even if the gas sensor 1 is inclined, so that a pressure in the electrolyte-accommodating space CS can be kept constant. For that purpose, in the gas sensor 1 of this embodiment, the two external electrodes for reaction electrode 51, 511, the external electrode for counter electrode 52, and the external electrode for reference electrode 53 are arranged so that the outflow-side air-permeable sheet OS that comprises two extension parts OS2, OS2 extending in substantially the same straight line in opposite directions to each other can be provided.

As described above, the second reaction electrode 311 is arranged so as to straddle the terminal edge of the extension groove part 2121*b* in the direction perpendicular to the extending direction of the extension groove part 2121*b*, in the second electrode structure-supporting space SS1 on the electrode structure support 212 of the case body 21 (see FIG. 14). Therefore, a part of the second reaction electrode 311 is provided on the case body 21 via (the extension part 37*b* of) the electrolyte-holding member for electrolyte supply 37, and the other part of the second reaction electrode 311 is provided on the case body 21 without via (the extension part 37*b* of) the electrolyte-holding member for electrolyte supply 37. As a result, more reliably, the second reaction electrode 311 is supplied with the electrolyte 6 from the electrolyte-holding member for electrolyte supply 37, and more reliably, a contact of the second reaction electrode 311 with the second lead wire for reaction electrode 411 is secured by pressing the second reaction electrode 311 with the hard case body 21 without via the electrolyte-holding member for electrolyte supply 37. For that purpose, as shown in FIG. 14, the second lead wire for reaction electrode 411 is preferably arranged so as to be connected to the other part of the second reaction electrode 311 provided on the case body 21 without via (the extension part 37*b* of) the electrolyte-holding member for electrolyte supply 37.

As shown in FIG. 13, the case cover 22 of the case 2 is provided with two capillary members 22*c*, 22*c*, corresponding to positions where the two reaction electrodes 31, 311 are provided, respectively. A gas flows from the gas inflow hole h1 provided in each of the two capillary members 22*c*, 22*c* into the case 2, and the gas is supplied to the two reaction electrodes 31, 311 provided, corresponding to the respective capillary members 22*c*. By providing a capillary member 22*c* for each reaction electrode 31, 311, the size of the gas inflow hole h1 can be changed depending on a type of gas to be detected, for example, for obtaining suitable gas output characteristics. However, the case cover 22 only needs to be provided with holes for a gas to flow into the case 2, corresponding to each of the reaction electrodes 31, 311, and only one capillary member may be provided, corresponding to any one of the two reaction electrodes 31, 311, or the capillary member may not necessarily be provided.

The gas sensor 1 of the second embodiment can be manufactured by the similar method to the method for manufacturing the gas sensor 1 as described regarding the gas sensor 1 of the first embodiment.

Third Embodiment

Figure 15:
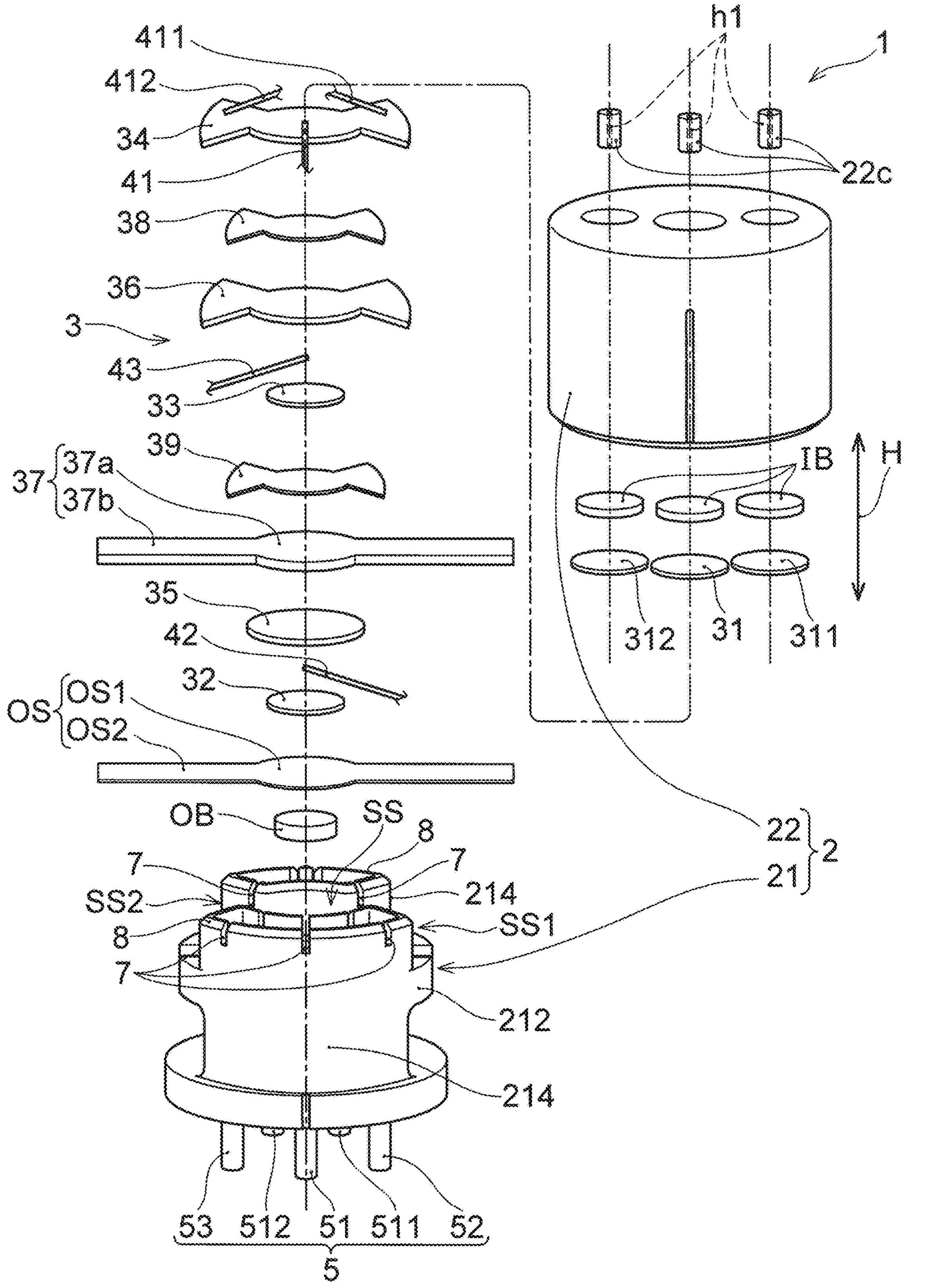
FIG. 15 is an exploded perspective view of a constant potential electrolytic gas sensor according to a third embodiment of the present invention.
Figure 16:
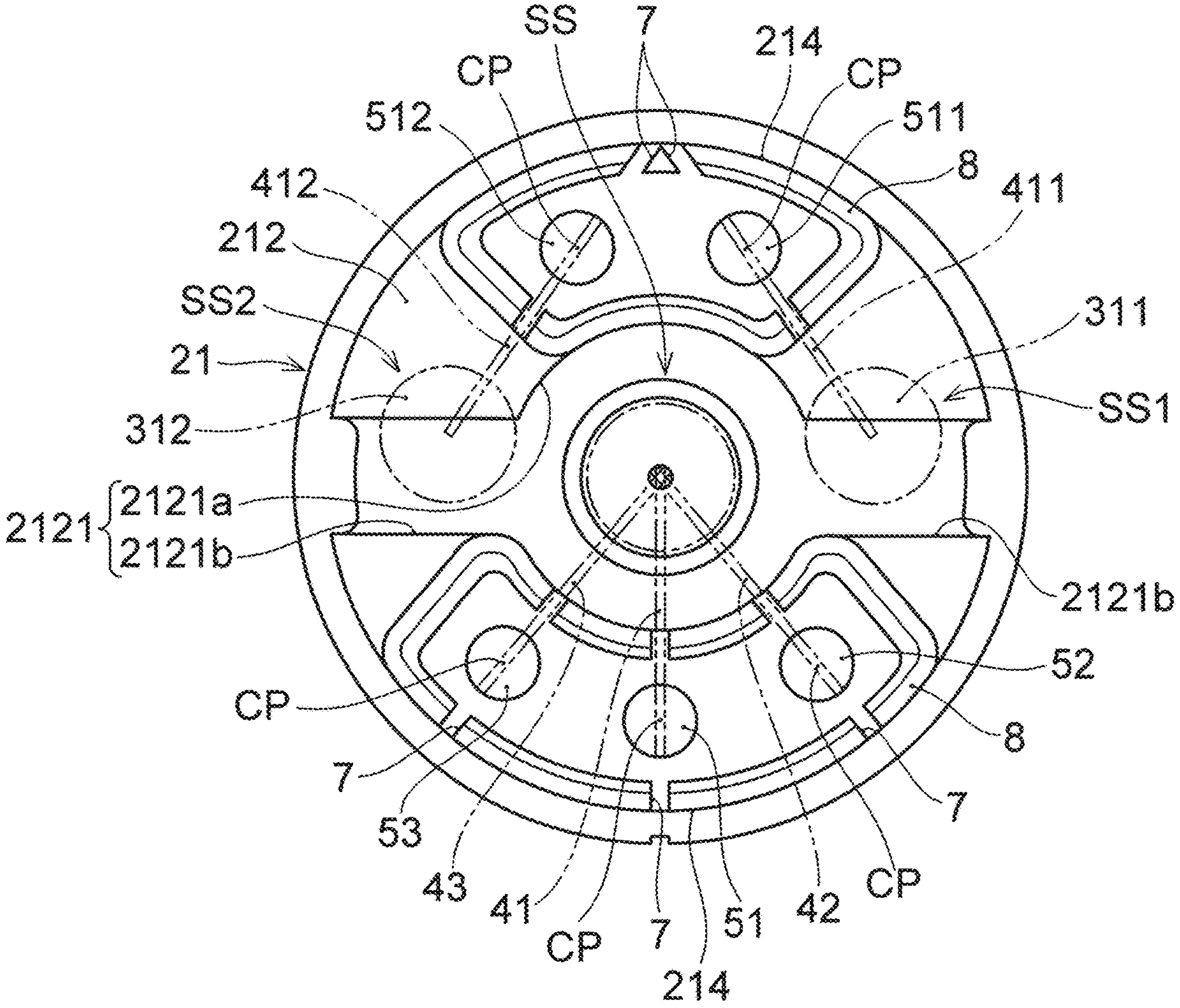
FIG. 16 is a top view of a case body of the constant potential electrolytic gas sensor in FIG. 15.

In the gas sensor 1 of the third embodiment, as shown in FIGS. 15 and 16, the electrode of the electrode structure 3 comprises three reaction electrodes 31, 311, 312 for detecting different gases to be detected, one counter electrode 32, and one reference electrode 33. In this embodiment, one counter electrode 32 and one reference electrode 33 are used in common for the three reaction electrodes 31, 311, 312. However, the electrode of the electrode structure 3 may comprise three counter electrodes corresponding to the three reaction electrodes 31, 311, 312, respectively. In that case, the three counter electrodes can be formed by, for example, film-making three electrode materials on one air-permeable sheet at an interval from each other, or can be formed to be separate and distinct from each other. The gas sensor 1 can detect a first gas to be detected, such as, for example, an oxygen gas, with the first reaction electrode 31 among the three reaction electrodes 31, 311, 312, detect a second gas to be detected, such as, for example, a hydrogen sulfide gas, with the second reaction electrode 311 among the three reaction electrodes 31, 311, 312, and detect a third gas to be detected, such as, for example, a carbon monoxide gas, with the third reaction electrode 312 among the three reaction electrodes 31, 311, 312. Here, the electrode of the electrode structure 3 may comprise two counter electrodes for the three reaction electrodes 31, 311, 312. The two counter electrodes can be used selectively depending on reaction that occurs on the counter electrode. For example, one of the two counter electrodes can be used for a reaction electrode to detect a gas to be detected that undergoes an oxidation reaction on the counter electrode (e.g., an oxygen gas), and the other of the two counter electrodes can be used for a reaction electrode to detect a gas to be detected that undergoes a reduction reaction occurs on the counter electrode (e.g., a hydrogen sulfide gas, a carbon monoxide gas). In that case, as described above, the two counter electrodes can be formed by, for example, film-making two electrode materials (for example, in substantially a semicircular shape) on one air-permeable sheet (for example, in substantially a circular shape) at a slit-like interval from each other, or can be formed to be separate and distinct from each other. Even where there are more than three reaction electrodes, similarly, the two counter electrodes can be selectively used depending on an oxidation reaction and a reduction reaction that occur on the counter electrode.

As shown in FIG. 15, the first to third reaction electrodes 31, 311, 312 are arranged so as not to overlap with each other when viewed in the height direction H. More specifically, the first reaction electrode 31 is laminated with the counter electrode 32 and the reference electrode 33 in the height direction H, and the second and third reaction electrodes 311, 312 are arranged at positions spaced apart from the first reaction electrode 31, the counter electrode 32, and the reference electrode 33 in a direction (horizontal direction) perpendicular to the height direction H. The second and third reaction electrodes 311, 312 are arranged at positions spaced apart from each other in a direction (horizontal direction) perpendicular to the height direction H. As a result, a gas can be supplied independently from the outside to each of the reaction electrodes 31, 311, 312. Although the positions of the three reaction electrodes 31, 311, 312 relative to each other in the height direction H are not particularly limited, in this embodiment, the second and third reaction electrodes 311, 312 are arranged at a height corresponding to the first reaction electrode 31 by fixing the first to third reaction electrodes 31, 311, 312 on the upper wall of the case cover 22. In this embodiment, the first to third reaction electrodes 31, 311, 312 have the same configuration as the reaction electrode 31 described in connection with the gas sensor 1 of the first embodiment, and have the same configuration with each other, but may have a different configuration from the reaction electrode 31 in the first embodiment or may have a different configuration from each other.

In the electrode structure 3 comprising the three reaction electrodes 31, 311, 312, the electrolyte-holding member for reaction electrode 34 laminated on the three reaction electrodes 31, 311, 312 is formed into a shape and a size that make a contact with all surfaces of the three reaction electrodes 31, 311, 312, as shown in FIG. 15. Thereby, the electrolyte 6 can be supplied to all of the three reaction electrodes 31, 311, 312 with one electrolyte-holding member for reaction electrode 34. In this embodiment, the electrolyte-holding member for reaction electrode 34 is formed into a sheet shape with a shape and a size that fit a first electrode structure-supporting space SS, a second electrode structure-supporting space SS1, and a third electrode structure-supporting space SS2 of the case body 21, which will be described below. Similarly, the electrolyte-holding member for reference electrode 36 is also formed into a sheet shape with substantially the same shape and size as the electrolyte-holding member for reaction electrode 34. In this embodiment, the electrolyte-holding member for counter electrode 35 is formed into substantially a circular sheet shape that fits the first electrode structure-supporting space SS, but may be formed into a sheet shape with substantially the same shape and size as the electrolyte-holding member for reaction electrode 34. Moreover, the support sheets 38, 39, which are optionally laminated within the electrode structure 3, have substantially the same shape as the electrolyte-holding member for reaction electrode 34 and the electrolyte-holding member for reference electrode 36, and the support sheets 38, 39 are formed into sizes smaller than those of the electrolyte-holding member for reaction electrode 34 and the electrolyte-holding member for reference electrode 36 so as not to hinder contacts between the electrolyte-holding members.

As shown in FIG. 15, the electrolyte-holding member for electrolyte supply 37, which is laminated within the electrode structure 3, comprises a sheet-like main body 37*a*, and two sheet-like extension parts 37*b*, 37*b* that protrude on substantially the same straight line in substantially opposite directions to each other in an out-of-plane direction from the main body 37*a*. The main body 37*a* is formed so as to fit into the first electrode structure-supporting space SS on the electrode structure support 212, which will be described below, and also to fit into a main body groove part 2121*a* (see FIG. 16) of the electrode structure support 212, which will be described below. The main body 37*a* is laminated with the first reaction electrode 31, the counter electrode 32, and the reference electrode 33 (as well as each electrolyte-holding member for electrode) in the first electrode structure-supporting space SS. Moreover, each of the two extension parts 37*b*, 37*b* is formed so as to fit into an extension groove part 2121*b* (see FIG. 16) of the electrode structure support 212, which will be described below. The two extension parts 37*b*, 37*b* extend in opposite directions to each other with respect to the electrode structure support 212 of the case body 21 and are bent at the outer edge of the electrode structure support 212 to be arranged at opposing positions in the electrolyte-accommodating space CS (also see FIG. 2). A part of each of the two extension parts 37*b*, 37*b* is partially laminated with each of the second and third reaction electrode 311, 312 (as well as the electrolyte-holding member for reaction electrode 34 and the electrolyte-holding member for reference electrode 36) in each of the second and third electrode structure-supporting spaces SS1, SS2.

The gas sensor 1 of this embodiment comprises three reaction electrodes 31, 311, 312, and accordingly as shown in FIGS. 15 and 16, comprises three lead wires for reaction electrode 41, 411, 412 connected to the three reaction electrodes 31, 311, 312, respectively, and three external electrodes for reaction electrode 51, 511, 512 connected to the three lead wires for reaction electrodes 41, 411, 412, respectively. That is, in the gas sensor 1 of this embodiment, the lead wire 4 includes three lead wires for reaction electrodes 41, 411, 412, a lead wire for counter electrode 42 connected to the counter electrode 32, and a lead wire for reference electrode 43 connected to the reference electrode 33. Moreover, the external electrode 5 includes three external electrodes for reaction electrode 51, 511, 512, an external electrode for counter electrode 52 connected to the lead wire for counter electrode 42, and an external electrode for reference electrode 53 connected to the lead wire for reference electrode 43. The three external electrodes for reaction electrode 51, 511, 512 are arranged so that connection points CP of the three external electrodes for reaction electrode 51, 511, 513 are located at heights corresponding to the three reaction electrodes 31, 311, 312. As a result, when connecting the three reaction electrodes 31, 311, 312 and the three external electrodes for reaction electrode 51, 511, 512 with the three lead wires for reaction electrode 41, 411, 412, all of the three lead wires for reaction electrode 41, 411, 412 can be wired along substantially a horizontal direction and do not need to be bent greatly, and therefore the three lead wires for reaction electrode 41, 411, 412 can be easily wired, and the gas sensor 1 can be easily manufactured.

In the gas sensor 1 of this embodiment, the case 2 has a configuration different from that of the case 2 of the gas sensor 1 of the first embodiment in order to additionally accommodate the second and third reaction electrodes 311, 312, the second and third lead wires for reaction electrode 411, 412, and the second and third external electrodes for reaction electrode 511, 512, with respect to the gas sensor 1 of the first embodiment. As shown in FIGS. 15 and 16, the case body 21 of the case 2 in this embodiment comprises one external electrode support 214 for supporting three external electrodes (in this embodiment, a first external electrode for reaction electrode 51, an external electrode for counter electrode 52, and an external electrode for reference electrode 53) and one external electrode support 214 for supporting two external electrodes (in this embodiment, second and third external electrodes for reaction electrode 511, 512). The external electrode support 214 for supporting three external electrodes 51, 52, 53 is provided with three guides 7 and one holding structure 8, and the external electrode support 214 for supporting two external electrodes 511, 512 is provided with two guides 7 and one holding structure 8. The guide 7 may have a structure similar to the guide 7 of the gas sensor 1 of the first embodiment, regardless of the illustrated example. Here, the number, the shape, the arrangement, etc. of the external electrode support, the guide, and the holding structure can be modified as appropriate depending on the number, the shape, the arrangement, etc. of the reaction electrode, the counter electrode, the reference electrode, and the external electrode.

In this embodiment, as shown in FIGS. 15 and 16, in the case body 21, a first electrode structure-supporting space SS surrounded by two external electrode supports 214, 214 in the vicinity of the center of the electrode structure support 212 in the horizontal direction and a second electrode structure-supporting space SS1 and a third electrode structure-supporting space SS2 between two external electrode supports 214, 214 adjacent to each other along the peripheral edge of the first electrode structure-supporting space SS are formed on the surface of the electrode structure support 212. In the first electrode structure-supporting space SS, the first reaction electrode 31, the counter electrode 32, and the reference electrode 33 (as well as each electrolyte-holding member for electrode) are supported, in the second electrode structure-supporting space SS1, the second reaction electrode 311 (as well as the electrolyte-holding member for reaction electrode 34 and the electrolyte-holding member for reference electrode 36) is supported, and in the third electrode structure-supporting space SS2, the third reaction electrode 312 (as well as the electrolyte-holding member for reaction electrode 34 and the electrolyte-holding member for reference electrode 36) is supported. Here, in this embodiment, the first electrode structure-supporting space SS is formed so as to have the same shape and size as the electrode structure-supporting space SS described in connection with the gas sensor 1 of the first embodiment, but the first electrode structure-supporting space SS may be formed into a shape and a size different from the electrode structure-supporting space SS in the first embodiment.

As shown in FIG. 16, in the electrode structure support 212 of the case body 21, a groove part 2121 is formed in which the outflow-side air-permeable sheet OS and the electrolyte-holding member for electrolyte supply 37 are arranged. The groove part 2121 is formed into a shape and a size into which the outflow-side air-permeable sheet OS and the electrolyte-holding member for electrolyte supply 37 can be inserted. The groove part 2121 comprises a main body groove part 2121*a* into which the main body OS1 of the outflow-side air-permeable sheet OS and the main body 37*a* of the electrolyte-holding member for electrolyte supply 37 can be inserted, and two extension groove parts 2121*b*, 2121*b* into which the extension part OS2 of the outflow-side air-permeable sheet OS and the extension part 37*b* of the electrolyte-holding member for electrolyte supply 37 can be inserted. The main body groove part 2121*a* is provided below the first electrode structure-supporting space SS, and each of the two extension groove parts 2121*b*, 2121*b* is provided on a part below the second and third electrode structure-supporting spaces SS1, SS2. The second and third reaction electrodes 311, 312 supported in the second and third electrode structure-supporting spaces SS1, SS2, respectively, are arranged so as to straddle the terminal edge of the extension groove part 2121*b* in a direction perpendicular to an extending direction of the extension groove part 2121*b*.

As shown in FIG. 15, the outflow-side air-permeable sheet OS arranged in the groove part 2121 of the electrode structure support 212 comprises a sheet-like main body OS1, and two sheet-like extension parts OS2, OS2 that protrude on substantially the same straight line in substantially opposite directions to each other in an out-of-plane direction from the main body OS1. The two extension parts OS2, OS2 extend along the extension groove part 2121*b* of the groove part 2121 in opposite directions to each other with respect to the electrode structure support 212 of the case body 21 and are bent at the outer edge of the electrode structure support 212 to be arranged at opposing positions in the electrolyte-accommodating space CS (also see FIG. 2). For example, if the gas sensor 1 is inclined toward one of the two extension parts OS2, OS2, the entirety of one extension part OS2 in the electrolyte-accommodating space CS is immersed into the electrolyte 6, which makes it difficult for a gas in the electrolyte-accommodating space CS to be discharged to the outside of the case 2 through the one extension part OS2. However, even if so, the other of the two extension parts OS2, OS2 is not at least partially immersed into the electrolyte 6 (in the vicinity of the boundary between the electrode structure support 212 and the electrolyte-accommodating space CS), so that a gas in the electrolyte-accommodating space CS can be discharged to the outside of the case 2 through the other extension part OS2. In the gas sensor 1 of this embodiment, by providing the outflow-side air-permeable sheet OS that comprises the two extension parts OS2, OS2 extending in substantially the same straight line in opposite directions to each other, a gas in the electrolyte-accommodating space CS can be discharged to the outside of the case 2 even if the gas sensor 1 is inclined, so that a pressure in the electrolyte-accommodating space CS can be kept constant. For that purpose, in the gas sensor 1 of this embodiment, the three external electrodes for reaction electrode 51, 511, 512, the external electrode for counter electrode 52, and the external electrode for reference electrode 53 are arranged so that the outflow-side air-permeable sheet OS that comprises the two extension parts OS2, OS2 extending in substantially the same straight line in opposite directions to each other can be provided.

As described above, the second and third reaction electrodes 311, 312 are arranged so as to straddle the terminal edge of the extension groove part 2121*b* in the direction perpendicular to the extending direction of the extension groove part 2121*b*, respectively, in the second and third electrode structure-supporting spaces SS1, SS2 on the electrode structure support 212 of the case body 21 (see FIG. 16). Therefore, a part of each of the second and third reaction electrodes 311, 312 is provided on the case body 21 via (the extension part 37*b* of) the electrolyte-holding member for electrolyte supply 37, and the other part of each of the second and third reaction electrodes 311, 312 is provided on the case body 21 without via (the extension part 37*b* of) the electrolyte-holding member for electrolyte supply 37. As a result, more reliably, the second and third reaction electrodes 311, 312 are supplied with the electrolyte 6 from the electrolyte-holding member for electrolyte supply 37, and more reliably, contacts of the second and third reaction electrodes 311, 312 with the second and third lead wires for reaction electrode 411, 412 are secured by pressing the second and third reaction electrodes 311, 312 with the hard case body 21 without via the electrolyte-holding member for electrolyte supply 37. For that purpose, as shown in FIG. 16, the second and third lead wires for reaction electrode 411, 412 are preferably arranged so as to be connected to the other part of the second and third reaction electrodes 311, 312 provided on the case body 21 without via (the extension part 37*b* of) the electrolyte-holding member for electrolyte supply 37, respectively. As shown in FIG. 15, the case cover 22 of the case 2 is provided with three capillary members 22*c*, corresponding to positions where the three reaction electrodes 31, 311, 312 are provided, respectively. A gas flows from the gas inflow hole h1 provided in each of the three capillary members 22*c* into the case 2, and the gas is supplied to the three reaction electrodes 31, 311, 312 provided, corresponding to the respective capillary members 22*c*. By providing a capillary member 22*c* for each reaction electrode 31, 311, 312, the size of the gas inflow hole h1 can be changed depending on a type of gas to be detected, for example, for obtaining suitable gas output characteristics. However, the case cover 22 only needs to be provided with holes for a gas to flow into the case 2, corresponding to each of the reaction electrodes 31, 311, 312, and only one capillary member may be provided, corresponding to any one of the three reaction electrodes 31, 311, 312, two capillary members may be provided, corresponding to any two of them, or the capillary member may not necessarily be provided.

The gas sensor 1 of the third embodiment can be manufactured by the similar method to the method for manufacturing the gas sensor 1 as described regarding the gas sensor 1 of the first embodiment.

The constant potential electrolytic gas sensor according to some embodiments of the present invention and the method for manufacturing the constant potential electrolytic gas sensor are described above. However, the constant potential electrolytic gas sensor of the present invention and the method for manufacturing the constant potential electrolytic gas sensor are not limited to the embodiments described above. The above-described embodiments mainly describe inventions having the following configurations.

(1) A constant potential electrolytic gas sensor comprising:

a case with a case body;

an electrode structure comprising at least two electrodes provided in the case body;

at least two lead wires that extend along respective surfaces of the at least two electrodes and are connected to the respective surfaces of the at least two electrodes; and at least two external electrodes that extend from the outside of the case to the inside of the case, are provided in the case body, and are connected to the at least two lead wires, respectively, wherein the at least two external electrodes are arranged so that a connection point of the external electrode to which the lead wire is connected is located at a height corresponding to the electrode structure, and wherein the case body has a holding structure that can hold a predetermined amount of protective agent so as to cover the connection point, with respect to each of the at least two external electrodes.

(2) The constant potential electrolytic gas sensor of (1), wherein the at least two external electrodes are arranged so that the heights of the connection points of the at least two external electrodes substantially match with each other.

(3) The constant potential electrolytic gas sensor of (1) or (2), wherein the holding structure comprises a wall part formed around the connection point of the external electrode in a horizontal direction.

(4) The constant potential electrolytic gas sensor of any one of (1) to (3), wherein the holding structure comprises a guide that guides the lead wire along an introduction path from the outside of the case body to the electrode structure via the connection point of the external electrode.

(5) The constant potential electrolytic gas sensor of (4), wherein the guide comprises:

a first guide that guides the lead wire from the outside of the case body toward the connection point of the external electrode; and a second guide that guides the lead wire from the connection point of the external electrode toward the electrode structure.

(6) The constant potential electrolytic gas sensor of (5), wherein the holding structure comprises a wall part formed around the connection point of the external electrode in a horizontal direction, wherein the first guide is constituted by a peripheral wall of a first recess provided in the wall part on the opposite side to the electrode structure in the introduction path, and wherein the second guide is constituted by a peripheral wall of a second recess provided in the wall part on the electrode structure side in the introduction path.

(7) The constant potential electrolytic gas sensor of any one of (1) to (6), wherein the at least two electrodes comprise at least two reaction electrodes for detecting different gases to be detected, a counter electrode, and a reference electrode, wherein the at least two lead wires comprise at least two lead wires for reaction electrode connected to the at least two reaction electrodes, respectively, a lead wire for counter electrode connected to the counter electrode, and a lead wire for reference electrode connected to the reference electrode, wherein the at least two external electrodes comprise at least two external electrodes for reaction electrode connected to the at least two lead wires for reaction electrodes, respectively, an external electrode for counter electrode connected to the lead wire for counter electrode, and an external electrode for reference electrode connected to the lead wire for reference electrode, wherein a first reaction electrode of the at least two reaction electrodes is laminated with the counter electrode and the reference electrode in a height direction, and wherein another reaction electrode of the at least two reaction electrodes is arranged at a height corresponding to the first reaction electrode at a position spaced apart from the first reaction electrode, the counter electrode, and the reference electrode in a direction perpendicular to the height direction.

(8) The constant potential electrolytic gas sensor of (7), wherein the at least two external electrodes for reaction electrode are arranged so that the connection points of the at least two external electrodes for reaction electrode are located at heights corresponding to the at least two reaction electrodes.

(9) A method for manufacturing a constant potential electrolytic gas sensor, the constant potential electrolytic gas sensor comprising:

a case with a case body;

an electrode structure comprising at least two electrodes provided in the case body:

at least two lead wires that extend along respective surfaces of the at least two electrodes and are connected to the respective surfaces of the at least two electrodes; and at least two external electrodes that extend from the outside of the case to the inside of the case, are provided in the case body, and are connected to the at least two lead wires, respectively, wherein the at least two external electrodes are arranged so that a connection point of the external electrode to which the lead wire is connected is located at a height corresponding to the electrode structure, wherein the case body has a holding structure that can hold a predetermined amount of protective agent so as to cover the connection point, with respect to each of the at least two external electrodes, and wherein the method comprises the steps of:

arranging the lead wire between the surface of the electrode and the connection point of the external electrode;

connecting the lead wire to the external electrode at the connection point of the external electrode with the lead wire being arranged on the surface of the electrode; and supplying the predetermined amount of protective agent to the holding structure so as to cover the connection point of the external electrode with the protective agent.

REFERENCE SIGNS LIST

1. Constant potential electrolytic gas sensor (gas sensor)
2. Case
21. Case body
211. Base
212. Electrode structure support
212*r*. Recess
2121. Groove part
2121*a*. Main body groove part
2121*b*. Extension groove part
213. Intermediate support
214. External electrode support
214*a*. Lower external electrode support
214*b*. Upper external electrode support
22. Case cover
22*c*. Capillary member
22*p*. Protrusion
22*r*. Recess
3. Electrode structure
31. Reaction electrode (first reaction electrode)
31*a*. Catalyst layer
31*b*. Air-permeable sheet
311. Second reaction electrode
312. Third reaction electrode
32. Counter electrode
33. Reference electrode
34. Electrolyte-holding member for reaction electrode
35. Electrolyte-holding member for counter electrode
36. Electrolyte-holding member for reference electrode
37. Electrolyte-holding member for electrolyte supply
37*a*. Main body
37*b*. Extension part
38, 39. Support sheet 4. Lead wire
41. Lead wire for reaction electrode (first lead wire for reaction electrode)
411. Second lead wire for reaction electrode
412. Third lead wire for reaction electrode
42. Lead wire for counter electrode
43. Lead wire for reference electrode
5. External electrode
51. External electrode for reaction electrode (first external electrode for reaction electrode)
511. Second external electrode for reaction electrode
512. Third external electrode for reaction electrode
52. External electrode for counter electrode
53. External electrode for reference electrode
6. Electrolyte
7. Guide
71. First guide
72. Second guide
8. Holding structure
B. Bottom part
CP. Connection point
CS. Electrolyte-accommodating space
H. Height direction
h1. Gas inflow hole
h2. Gas outflow hole
IB. Inflow-side buffer film
OB. Outflow-side buffer film
OS. Outflow-side air-permeable sheet
OS1. Main body
OS2. Extension part
PA. Protective agent
S. Internal space
SS. Electrode structure-supporting space (first electrode structure-supporting space)
SS1. Second electrode structure-supporting space
SS2. Third electrode structure-supporting space
W. Wall part
W1. Partition wall
WR1. First recess
WR2. Second recess

The invention claimed is:

1. A constant potential electrolytic gas sensor comprising:
a case with a case body;
an electrode structure comprising at least two electrodes provided in the case body;
at least two lead wires that extend along respective surfaces of the at least two electrodes and are connected to the respective surfaces of the at least two electrodes; and
at least two external electrodes that extend from the outside of the case to the inside of the case, are provided in the case body, and are connected to the at least two lead wires, respectively,
wherein the at least two external electrodes are arranged so that a connection point of each of the at least two external electrodes to which a respective one of the at least two lead wires is connected is located at a height corresponding to the electrode structure, and
wherein the case body has a holding structure that can hold a predetermined amount of a corrosion-suppressing protective agent so as to cover the respective connection point of each of the at least two external electrodes, and
wherein the holding structure comprises a guide that guides each of the at least two lead wires along an introduction path from the outside of the case body to the electrode structure via the respective connection point of each of the at least two external electrodes, the introduction path being a space defined by the guide and extending from the outside of the case body to the electrode structure via the respective connection point.

2. The constant potential electrolytic gas sensor of claim 1, wherein the at least two external electrodes are arranged so that the heights of the connection points of the at least two external electrodes substantially match with each other.

3. The constant potential electrolytic gas sensor of claim 1, wherein the holding structure comprises a wall part formed around the respective connection point of each of the at least two external electrodes in a horizontal direction.

4. The constant potential electrolytic gas sensor of claim 1,
wherein the guide comprises:
a first guide that guides each of the at least two lead wires from the outside of the case body toward the respective connection point of each of the at least two external electrodes; and
a second guide that guides each of the at least two lead wires from the respective connection point of each of the at least two external electrodes toward the electrode structure.

5. The constant potential electrolytic gas sensor of claim 4,
wherein the holding structure comprises a wall part formed around the respective connection point of each of the at least two external electrodes in a horizontal direction,
wherein the first guide is constituted by a peripheral wall of a first recess provided in the wall part on the opposite side to the electrode structure in the introduction path, and
wherein the second guide is constituted by a peripheral wall of a second recess provided in the wall part on the electrode structure side in the introduction path.

6. The constant potential electrolytic gas sensor of claim 1, wherein the at least two electrodes comprise at least two reaction electrodes for detecting different gases to be detected, a counter electrode, and a reference electrode,
wherein the at least two lead wires comprise at least two reaction electrode lead wires respectively connected to respective surfaces of the at least two reaction electrodes, a counter electrode lead wire connected to a surface of the counter electrode, and a reference electrode lead wire connected to a surface of the reference electrode,
wherein the at least two external electrodes comprise at least two reaction electrode external electrodes respectively connected to the at least two reaction electrode lead wires a counter electrode external electrode connected to the counter electrode lead wire, and a reference electrode external electrode connected to the reference electrode lead wire,
wherein a first reaction electrode of the at least two reaction electrodes is laminated with the counter electrode and the reference electrode in a height direction, and
wherein another reaction electrode of the at least two reaction electrodes is arranged at a height corresponding to the first reaction electrode at a position spaced apart from the first reaction electrode, the counter electrode, and the reference electrode in a direction perpendicular to the height direction.

7. The constant potential electrolytic gas sensor of claim 6, wherein the at least two reaction electrode external electrodes are arranged so that the respective connection points of the at least two reaction electrode external electrodes are located at heights corresponding to the at least two reaction electrodes, respectively.

8. A method for manufacturing a constant potential electrolytic gas sensor, the method comprising:

providing a case with a case body, an electrode structure comprising at least two electrodes provided in the case body, at least two lead wires, and at least two external electrodes that extend from the outside of the case to the inside of the case, and are provided in the case body;

wherein the at least two external electrodes are arranged so that a connection point of each of the at least two external electrodes to which a respective one of the at least two lead wires is connected is located at a height corresponding to the electrode structure, wherein the case body has a holding structure that can hold a predetermined amount of a corrosion-suppressing protective agent so as to cover the respective connection point of each of the at least two external electrodes, wherein the holding structure comprises a guide that guides each of the at least two lead wires along an introduction path from the outside of the case body to the electrode structure via the respective connection point of each of the at least two external electrodes, the introduction path being a space defined by the guide and extending from the outside of the case body to the electrode structure via the respective connection point, and wherein the method further comprises the steps of:

arranging each of the at least two lead wires between a respective surface of each of the at least two electrodes and the respective connection point of each of the at least two external electrodes;

connecting each of the at least two lead wires to the respective surface of each of the at least two electrodes so as to extend along the respective surface;

connecting each of the at least two lead wires to the respective one of the at least two external electrodes at the respective connection point of each of the at least two external electrodes, with each of the at least two lead wires being arranged on the respective surface of each of the at least two electrodes; and supplying the predetermined amount of the corrosion-suppressing protective agent to the holding structure so as to cover the respective connection point of each of the at least two external electrodes with the corrosion-suppressing protective agent.

* * * * *